US012682868B2

(12) United States Patent
Lee et al.

(10) Patent No.: US 12,682,868 B2
(45) Date of Patent: Jul. 14, 2026

(54) ELECTRONIC DEVICE COMPRISING DISPLAY PROVIDING SIGNAL TO PROCESSOR

(71) Applicant: Samsung Electronics Co., Ltd., Suwon-si (KR)

(72) Inventors: Jaesung Lee, Suwon-si (KR); Kyounghwan Kwon, Suwon-si (KR); Jongkon Bae, Suwon-si (KR); Donghwy Kim, Suwon-si (KR); Byungduk Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/090,023

(22) Filed: Mar. 25, 2025

(65) Prior Publication Data

US 2025/0225954 A1 Jul. 10, 2025

Related U.S. Application Data

(63) Continuation of application No. PCT/KR2023/015034, filed on Sep. 27, 2023.

(30) Foreign Application Priority Data

Sep. 30, 2022 (KR) ........................ 10-2022-0125366
Dec. 8, 2022 (KR) ........................ 10-2022-0171011
(Continued)

(51) Int. Cl.
*G09G 5/00* (2006.01)
*G06V 10/74* (2022.01)
*G09G 5/36* (2006.01)

(52) U.S. Cl.
CPC ............. *G09G 5/36* (2013.01); *G06V 10/761* (2022.01)

(58) Field of Classification Search
CPC ........... G06V 10/761; G09G 2320/103; G09G 2330/021; G09G 2340/0435;
(Continued)

(56) References Cited

U.S. PATENT DOCUMENTS 8,111,230 B2 2/2012 Nakai et al.
9,524,694 B2 12/2016 Wang et al.
(Continued)

FOREIGN PATENT DOCUMENTS

CN 113870812 A 12/2021
JP 4516280 B2 5/2010
(Continued)

OTHER PUBLICATIONS

International Search Report for PCT/KR2023/015034 mailed Jan. 22, 2024, 5 pages with English translation.
(Continued)

*Primary Examiner* — Insa Sadio
(74) *Attorney, Agent, or Firm* — Nixon & Vanderhye P.C.

(57) ABSTRACT

An electronic device may include a processor. The electronic device may include a display including a display drive circuit and a display panel. The electronic device may include a first interface connecting the processor and the display drive circuit. The electronic device may include a second interface connecting the processor and the display drive circuit. The display drive circuit may be configured to display, on the display panel, a first image received from the processor through the first interface. The display drive circuit may be configured to display, on the display panel, a second image following the first image and received from the processor through the first interface. The display drive circuit may be configured to determine, while the second image is being displayed on the display panel, whether the second image is at least partially different from the first
(Continued)

image maintained on the display panel for a longer period of time than a reference time according to at least one display of the first image including the display of the first image, the determination being made on the basis of the first image. The display drive circuit may be configured to provide a signal for requesting retransmission of the second image to the processor through the second interface in response to the second image which is at least partially different from the first image.

20 Claims, 14 Drawing Sheets

(30)            Foreign Application Priority Data

| Jan. 11, 2023 | (KR) | ........................ 10-2023-0004339 |
| Feb. 10, 2023 | (KR) | ........................ 10-2023-0018321 |
| Mar. 21, 2023 | (KR) | ........................ 10-2023-0036684 |
| Sep. 25, 2023 | (WO) | ............... PCT/KR2023/014714 |

(58) Field of Classification Search
CPC ........... G09G 2360/18; G09G 2370/04; G09G 2370/10; G09G 5/00; G09G 5/006; G09G 5/36
See application file for complete search history.

(56)            References Cited

U.S. PATENT DOCUMENTS

| 9,653,029 | B2 | 5/2017 | Wang et al. |
| 9,905,193 | B2 | 2/2018 | Oh et al. |
| 9,942,512 | B2 | 4/2018 | Kim et al. |
| 10,269,292 | B2 | 4/2019 | Bae et al. |
| 10,762,870 | B2 | 9/2020 | Han et al. |
| 10,810,927 | B2 | 10/2020 | Lee et al. |
| 10,818,270 | B2 | 10/2020 | Bae et al. |
| 11,037,477 | B2 | 6/2021 | Choi et al. |
| 11,037,518 | B2 | 6/2021 | Toyoda et al. |
| 11,205,400 | B1 | 12/2021 | Jang |
| 11,417,295 | B2 | 8/2022 | Glen |
| 11,631,355 | B2 | 4/2023 | Park et al. |
| 11,693,466 | B2 | 7/2023 | Park et al. |
| 11,862,125 | B2 | 1/2024 | Lee et al. |
| 12,223,917 | B2 | 2/2025 | Cheon et al. |
| 2015/0138212 | A1 | 5/2015 | Bae et al. |
| 2015/0279334 | A1 | 10/2015 | Kwa et al. |
| 2017/0004753 | A1 | 1/2017 | Kim et al. |
| 2019/0146744 | A1* | 5/2019 | Chun .................... G06F 3/1454 |
| | | | 345/592 |
| 2019/0295493 | A1* | 9/2019 | Zhong ........................ G06F 9/30 |
| 2019/0325844 | A1 | 10/2019 | Ansari et al. |
| 2021/0055848 | A1 | 2/2021 | Bae et al. |
| 2021/0266495 | A1 | 8/2021 | Fan et al. |
| 2023/0161455 | A1 | 5/2023 | Kim et al. |
| 2024/0112620 | A1 | 4/2024 | Lee et al. |

FOREIGN PATENT DOCUMENTS

| JP | 6645738 | B2 | 1/2020 |
| KR | 10-0510650 | B1 | 8/2005 |
| KR | 20130027094 | A | 3/2013 |
| KR | 20150007948 | A | 1/2015 |
| KR | 20150057404 | A | 5/2015 |
| KR | 101786649 | B1 | 10/2017 |
| KR | 20190074776 | A | 6/2019 |
| KR | 20200024383 | A | 3/2020 |
| KR | 20200037530 | A | 4/2020 |
| KR | 102189928 | B1 | 12/2020 |
| KR | 102247742 | B1 | 4/2021 |
| KR | 102305765 | B1 | 9/2021 |
| KR | 102333724 | B1 | 11/2021 |
| KR | 20220021962 | A | 2/2022 |
| KR | 20220081161 | A | 6/2022 |
| KR | 102442662 | B1 | 9/2022 |
| KR | 20220129151 | A | 9/2022 |
| KR | 102545078 | B1 | 6/2023 |
| KR | 102674204 | B1 | 6/2024 |
| WO | 2022030996 | A1 | 2/2022 |

OTHER PUBLICATIONS

Written Opinion of the ISA for PCT/KR2023/015034 mailed Jan. 22, 2024, 3 pages.
International Search Report for PCT/KR2023/014714 mailed Jan. 11, 2024, 5pages with English translation.
Written Opinion of the ISA for PCT/KR2023/014714 mailed Jan. 11, 2024, 4 pages.
Extended European Search Report dated Nov. 7, 2025 for EP Application No. 23873208.5.

* cited by examiner

ELECTRONIC DEVICE COMPRISING DISPLAY PROVIDING SIGNAL TO PROCESSOR

CROSS-REFERENCE TO RELATED APPLICATIONS

This application is a continuation application of International Application No. PCT/KR2023/015034 designating the United States, filed on Sep. 27, 2023, in the Korean Intellectual Property Receiving Office and claiming priority to Korean Patent Application No. 10-2022-0125366, filed on Sep. 30, 2022, Korean Patent Application No. 10-2022-0171011, filed on Dec. 8, 2022, Korean Patent Application No. 10-2023-0004339, filed on Jan. 11, 2023, Korean Patent Application No. 10-2023-0018321, filed on Feb. 10, 2023, Korean Patent Application No. 10-2023-0036684, filed on Mar. 21, 2023, and PCT/KR2023/014714 filed Sep. 25, 2023, the disclosures of which are all hereby incorporated by reference herein in their entireties.

BACKGROUND

Technical Field

Certain example embodiments may relate to an electronic device including a display that provides a signal to a processor.

Background Art

An electronic device may include a display panel. For example, the electronic device may include display driver circuitry operably coupled with the display panel. For example, the display driver circuitry may display an image obtained from a processor of the electronic device on the display panel.

The above-described information may be provided as a related art for the purpose of helping to understand the present disclosure. No claim or determination is raised as to whether any of the above-described information may be applied as a prior art related to the present disclosure.

SUMMARY

An electronic device may comprise a processor comprising processing circuitry. The electronic device may, for example, comprise a display including display driver circuitry and a display panel. The electronic device may comprise a first interface, comprising circuitry, connecting the display driver circuitry to the processor. The electronic device may comprise a second interface, comprising circuitry, connecting the display driver circuitry to the processor. The display driver circuitry may be configured to display, on the display panel, a first image received via the first interface from the processor. The display driver circuitry may be configured to display, on the display panel, a second image, subsequent to the first image, received via the first interface from the processor. The display driver circuitry may be configured to, while displaying the second image on the display panel, based on the first image being maintained on the display panel during a time duration longer than a reference time duration in accordance with at least one displaying of the first image, identify whether the second image is at least partially different from the first image, wherein the at least one displaying of the first image may include the displaying of the first image. The display driver circuitry may be configured to, in response to the second image at least partially different from the first image, provide, via the second interface, to the processor, a signal for requesting a retransmission of the second image.

An example electronic device may comprise a processor comprising processing circuitry. The electronic device may comprise a display including display driver circuitry and a display panel. The electronic device may comprise a first interface connecting the display driver circuitry to the processor. The electronic device may comprise a second interface connecting the display driver circuitry to the processor. The display driver circuitry may be configured to display, on the display panel, an image received via the first interface from the processor. The display driver circuitry may be configured to identify a first time between a displaying on the display panel executed before the displaying of the image and the displaying of the image. The display driver circuitry may be configured to identify a second time elapsed after the displaying of the image. The display driver circuitry may be configured to identify a difference between the first time and the second time. The display driver circuitry may be configured to, in response to the difference longer than a reference time duration, provide, via the second interface, to the processor, a signal for requesting an image transmission from the processor to the display driver circuitry.

An example electronic device i may comprise a processor. The electronic device may comprise a display including display driver circuitry and a display panel. The electronic device may comprise a first interface connecting the display driver circuitry to the processor. The electronic device may comprise a second interface connecting the display driver circuitry to the processor. The display driver circuitry may be configured to display, on the display panel, an image received via the first interface from the processor. The display driver circuitry may be configured to identify a time elapsed after the displaying of the image while the processor is in a sleep state. The display driver circuitry may be configured to, in response to the time longer than a reference time duration, provide, via the second interface, to the processor in the sleep state, a signal for requesting an image transmission from the processor to the display driver circuitry.

DETAILED DESCRIPTION

Figure 1:
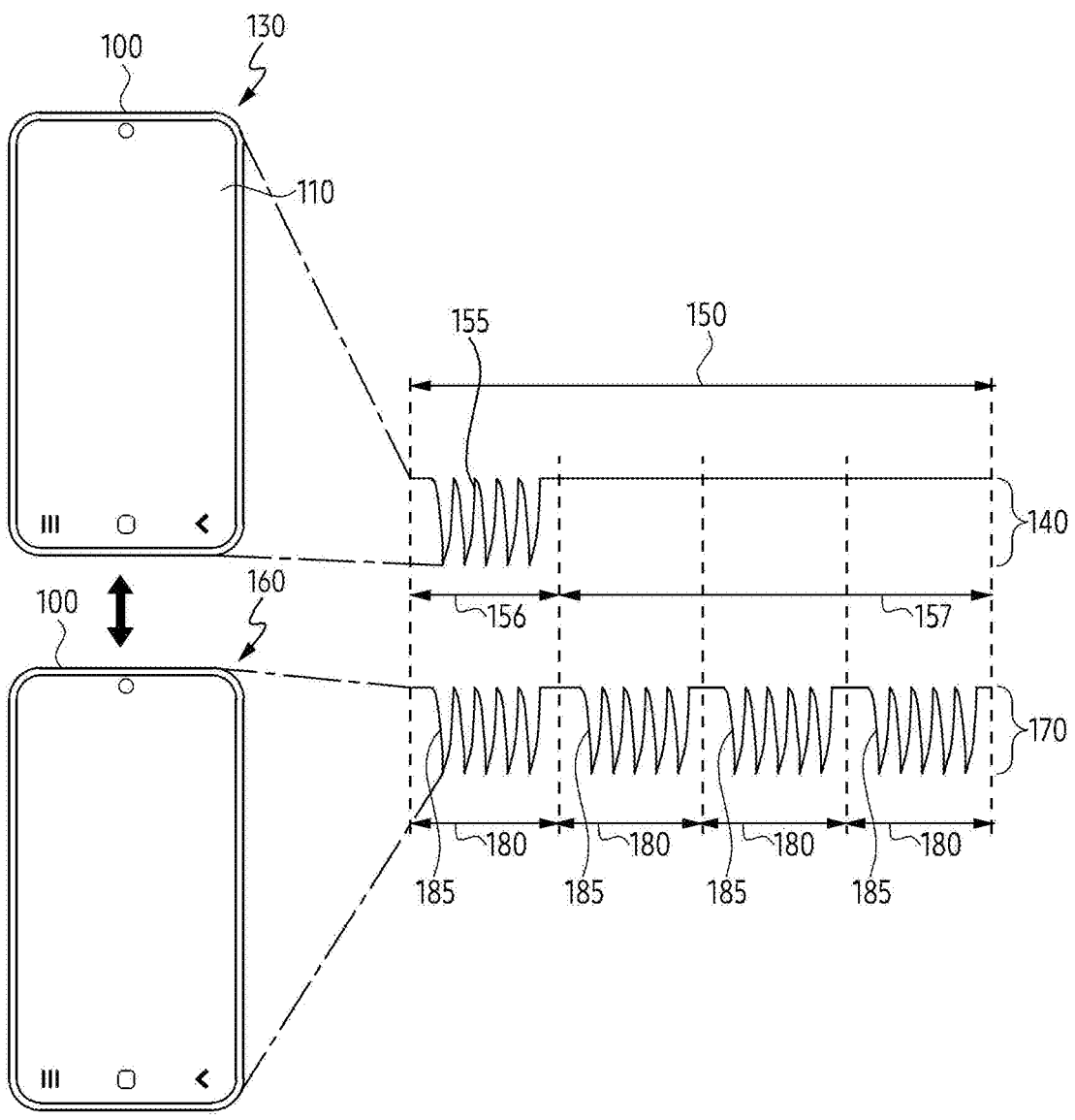
FIG. 1 illustrates an exemplary electronic device that adaptively changes a refresh rate to display an image on a display panel.

FIG. 1 illustrates an exemplary electronic device that adaptively changes a refresh rate to display an image on a display panel.

Referring to FIG. 1, an electronic device 100 may include a display panel 110. For example, the display panel 110 may be used to display an image. For example, the electronic device 100 may display the image on the display panel 110 based on a refresh rate.

For example, the electronic device 100 may adaptively change the refresh rate. For example, the electronic device 100 may lower the refresh rate to reduce power consumed by displaying an image on the display panel 110. For example, lowering the refresh rate may be executed based on identifying that displaying of the image is maintained. For example, lowering the refresh rate may be executed based on identifying displaying of a static image. For example, the electronic device 100 may raise the refresh rate to enhance quality of an image displayed on the display panel 110. For example, raising the refresh rate may be executed based on identifying displaying of a dynamic image. For example, raising the refresh rate may be executed based on identifying an event, such as a reception of a user input.

For example, the electronic device 100 may display an image based on a first refresh rate, as in a state 130. For example, the electronic device 100 may display an image based on a second refresh rate higher than the first refresh rate, as in a state 160. For example, the electronic device 100 may change the state 130 to the state 160 to enhance quality of an image displayed on the display panel 110. For example, the electronic device 100 may change the state 160 to the state 130 to reduce power consumed by displaying an image on the display panel 110.

For example, the state 130 may reduce power consumed by displaying an image on the display panel 110, but an afterimage, image sticking, or image persistence may occur in the state 130. For example, the power consumed within the state 130 is less than the power consumed within the state 160, but a probability of afterimage occurring within the state 130 may be higher than a probability of afterimage occurring within the state 160.

For example, a chart 140 illustrates an example of displaying an image in the state 130. A horizontal axis of the chart 140 indicates time, and a vertical axis of the chart 140 indicates a state of a signal outputted from a source driver to display an image on display panel 110. For example, in a state 130, the electronic device 100 may display the image on the display panel 110 within a time interval 150 corresponding to the first refresh rate. For example, on a condition that the first refresh rate is 30 hertz (Hz), the time interval 150 may be $\frac{1}{30}$ seconds(s). For example, the time interval 150 may include a partial time interval 156 and a partial time interval 157. For example, the electronic device 100 may display the image on the display panel 110 within the time interval 150 by outputting a signal 155 within the partial time interval 156. For example, in the time interval 150, the signal 155 may be outputted within the partial time interval 156 and not within the partial time interval 157.

For example, a chart 170 illustrates an example of displaying an image in the state 160. A horizontal axis of the chart 170 indicates time, and a vertical axis of the chart 170 indicates a state of a signal outputted from the source driver to display an image on the display panel 110. For example, in the state 160, the electronic device 100 may display the image on the display panel 110 within a time interval 180 corresponding to the second refresh rate. For example, on a condition that the second refresh rate is 120 (Hz), the time interval 180 may be $\frac{1}{120}$ (s). For example, the electronic device 100 may display the image on the display panel 110 within the time interval 180 by outputting a signal 185 within the time interval 180. For example, a length of the time interval 180 may correspond to the partial time interval 156.

For example, unlike the time interval 180 for the second refresh rate, the time interval 150 for the first refresh rate may include the partial time interval 157 in which the signal 155 is not outputted, so a probability that an afterimage will occur in the state 130 may be higher than a probability that an afterimage will occur in the state 160. For example, the afterimage may be caused by hysteresis in a driving transistor for driving an organic light emitting diode (or sub-pixel) in the display panel 110. The hysteresis may be exemplified through FIG. 2.

Figure 2:
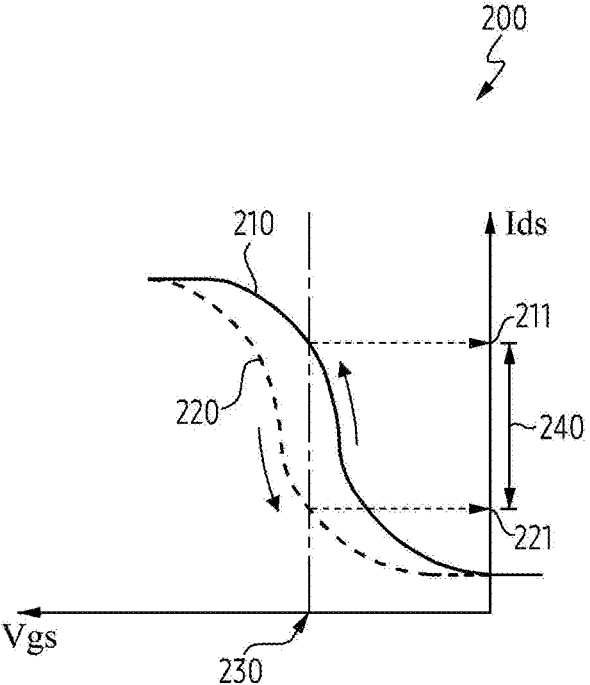
FIG. 2 is a chart illustrating hysteresis within an example driving transistor.

FIG. 2 is a chart illustrating hysteresis within a driving transistor.

Referring to FIG. 2, a threshold voltage of the driving transistor may be shifted when an image of a first color (e.g., black) is changed to an image of a second color (e.g., white). For example, the shifting of the threshold voltage may cause a change in luminance provided by an organic light emitting diode driven through the driving transistor.

For example, a chart 200 indicates the change. A horizontal axis of the chart 200 indicates a gate-source voltage (Vgs) of the driving transistor, and a vertical axis of the chart 200 indicates a current applied to the organic light emitting diode (or current from a drain of the driving transistor to a source of the driving transistor) (Ids). For example, a line 210 in the chart 200 illustrates a relationship between a gate-source voltage (Vgs) and a current (Ids) for an image of the first color, and a line 220 in the chart 200 illustrates a relationship between a gate-source voltage (Vgs) and a current (Ids) for an image of the second color. As in the chart 200, the line 220 may be offset with respect to the line 210. For example, a value 211 of the current (Ids) at the line 210 when the gate-source voltage (Vgs) is a value 230 may be different from a value 221 of the current (Ids) at the line 220 when the gate-source voltage (Vgs) is the value 230. For example, a difference 240 between the value 211 and the value 221 may cause the afterimage.

Referring back to FIG. 1, the electronic device 100 may execute operations for reducing the afterimage, as exemplified below.

For example, the electronic device 100 may enhance quality of an image displayed on the display panel 110 by changing the state 130 to the state 160. For example, the electronic device 100 may reduce power consumed while displaying an image on the display panel 110, by changing the state 160 to the state 130. For example, in case that a difference between the first refresh rate and the second refresh rate is greater than or equal to a certain level, a direct change from the state 130 to the state 160 may enhance image quality, but a direct change from the state 130 to the state 160 may cause flickering. For example, in case that a difference between the first refresh rate above and the second refresh rate is greater than or equal to a certain level, a direct change from the state 160 to the state 130 may reduce power consumption, but a direct change from the state 160 to the state 130 may cause flickering. The flickering may be exemplified through FIG. 3.

Figure 3:
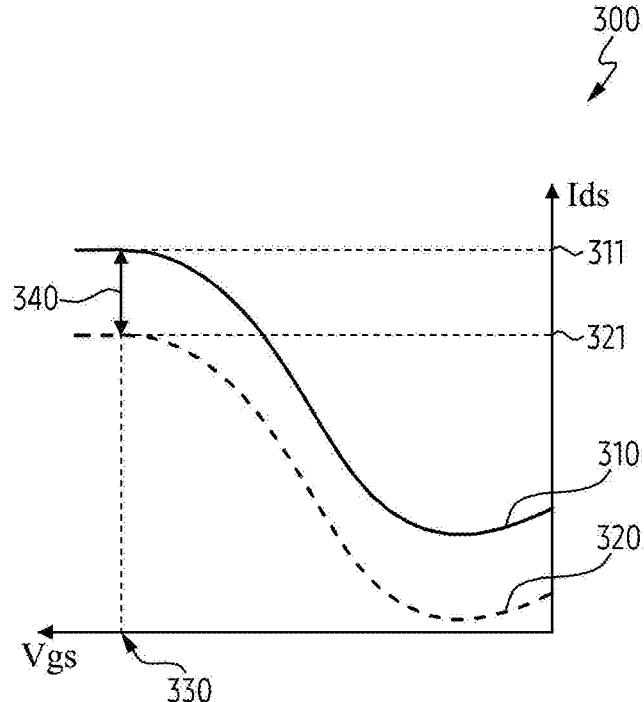
FIG. 3 is a chart illustrating an example change in a current applied to an organic light-emitting diode in accordance with a change in a refresh rate.

FIG. 3 is a chart illustrating a change in a current applied to an organic light-emitting diode in accordance with a change in a refresh rate.

Referring to FIG. 3, a relationship between a gate-source voltage of the driving transistor and a current applied to the organic light emitting diode (or current from a drain of the driving transistor to a source of the driving transistor) may be changed in accordance with a change in the refresh rate. For example, the relationship that is changed in accordance with the refresh rate may cause the flickering.

For example, a chart 300 indicates the change of the relationship in accordance with the change in the refresh rate. A horizontal axis of the chart 300 indicates a gate-source voltage (Vgs) of the driving transistor, and a vertical axis of chart the 300 indicates a current applied to the organic light emitting diode (or current from a drain of the driving transistor to a source of the driving transistor) (Ids). For example, a line 310 in the chart 300 illustrates a relationship between a gate-source voltage (Vgs) and a current (Ids) for the first refresh rate, and a line 320 in the chart 300 illustrates a relationship between a gate-source voltage (Vgs) and a current (Ids) for the second refresh rate. As in the chart 300, the line 320 may be offset with respect to the line 310. For example, a value 311 of the current (Ids) at the line 310 when the gate-source voltage (Vgs) is a value 330 may be different from a value 321 of the current (Ids) at the line 320 when the gate-source voltage (Vgs) is a value 330. For example, in case that a difference 340 between the value 311 and the value 321 is greater than or equal to a certain level, a direct change from the state 130 to the state 160 and/or a direct change from the state 130 to the state 130 may cause the flickering.

Referring back to FIG. 1, the electronic device 100 may execute operations for reducing the flickering in accordance with the change in the refresh rate, as exemplified below.

Figure 4:
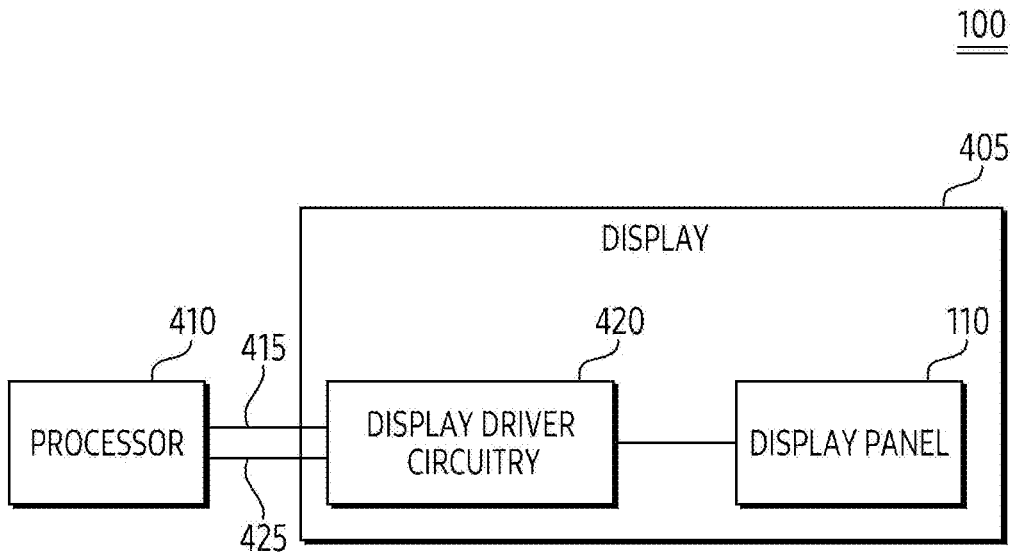
FIG. 4 is a simplified block diagram of an exemplary electronic device.

FIG. 4 is a simplified block diagram of an exemplary electronic device.

Referring to FIG. 4, the electronic device 100 may include a display 405 and a processor 410. The display 405 may include display driver circuitry 420 and a display panel 110.

Figure 13:
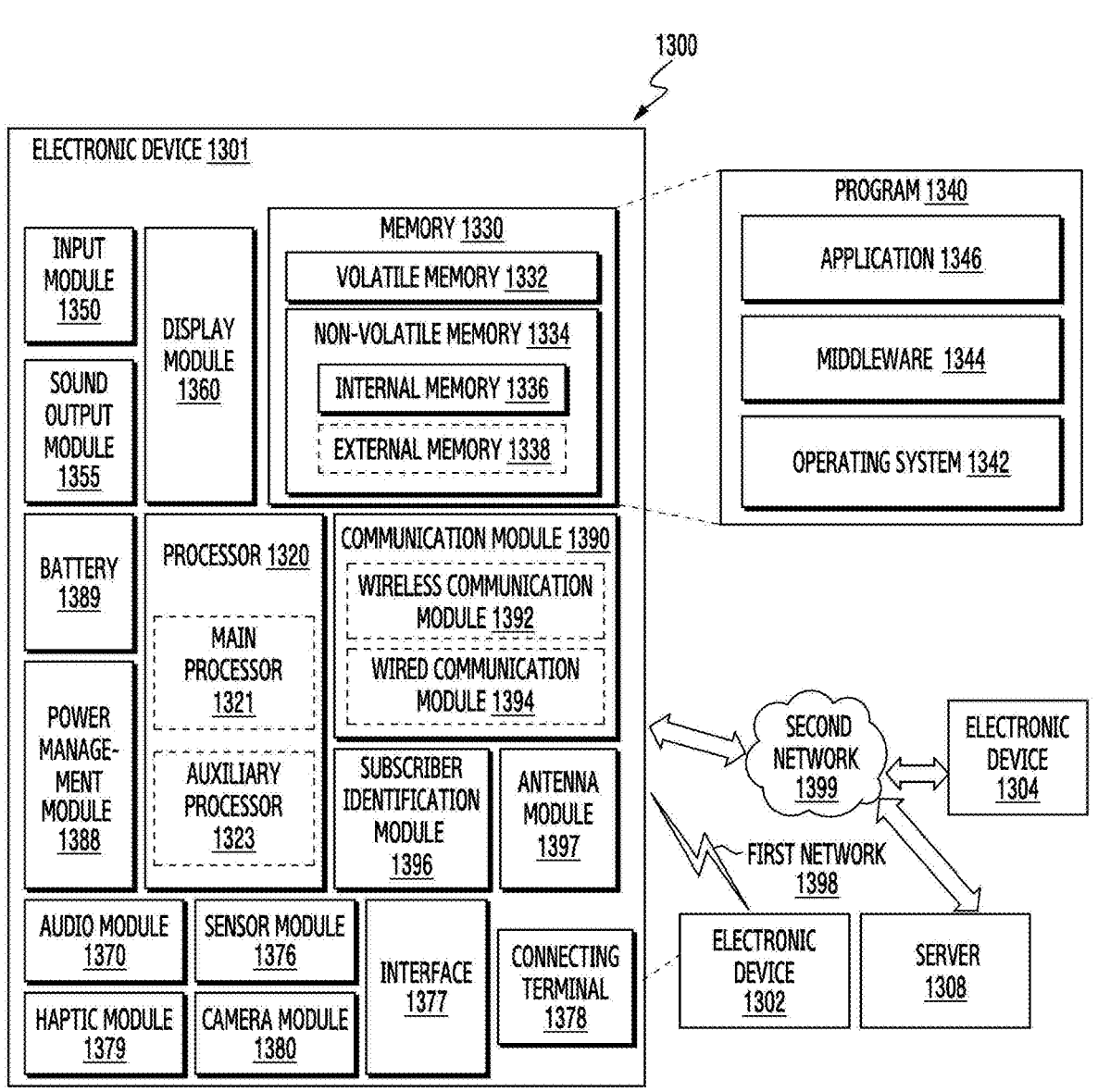
FIG. 13 is a block diagram of an electronic device in a network environment according to various example embodiments.

The processor 410 may include at least a portion of a processor 1320 of FIG. 13. For example, the processor 410 may include a central processing unit (CPU), a graphics processing unit (GPU), or a display controller (or display processing unit (DPU)) configured to process an image obtained from a volatile memory into a suitable format for the display panel 110. For example, the processor 410 may be operably coupled with the display driver circuitry 420.

For example, the processor 410 being operably coupled with the display driver circuitry 420 may indicate that the processor 410 is directly connected to the display driver circuitry 420. For example, the processor 410 being operably coupled with the display driver circuitry 420 may indicate that the processor 410 is connected to the display driver circuitry 420 through another component(s) of the electronic device 100. Thus, "connected" as used herein covers both direct and indirect connections. For example, the processor 410 may be connected to the display driver circuitry 420 through a first interface 415 and/or a second interface 425 separated from the first interface 415. For example, the first interface 415 may be used to transmit an image from the processor 410 to the display driver circuitry 420. For example, the first interface 415 may be a display serial interface (DSI) of a mobile industry process interface (MIPI) alliance. However, it is not limited thereto. For example, the second interface 425 may be used to provide a first signal and/or a second signal to be exemplified below. For example, the second interface 425 may be further used to provide a synchronization signal to be exemplified below. However, it is not limited thereto. As a non-limiting example, the synchronization signal may be referred to as an external synchronization signal (Esync). For example, the synchronization signal may be provided from the processor 410 to the display driver circuitry 420 through a third interface (not illustrated in FIG. 4) that is separated from the first interface 415 and the second interface 425 and connects the processor 410 and the display driver circuitry 420. However, it is not limited thereto.

For example, the processor 410 being operably coupled with the display driver circuitry 420 may indicate that the display driver circuitry 420 operates based on instructions executed by the processor 410. For example, the processor 410 being operably coupled with the display driver circuitry 420 may indicate that the display driver circuitry 420 is controlled by the processor 410. For example, the processor 410 may display an image on the display panel 110 using the display driver circuitry 420 based on a video mode of the DSI. However, it is not limited thereto.

Figure 14:
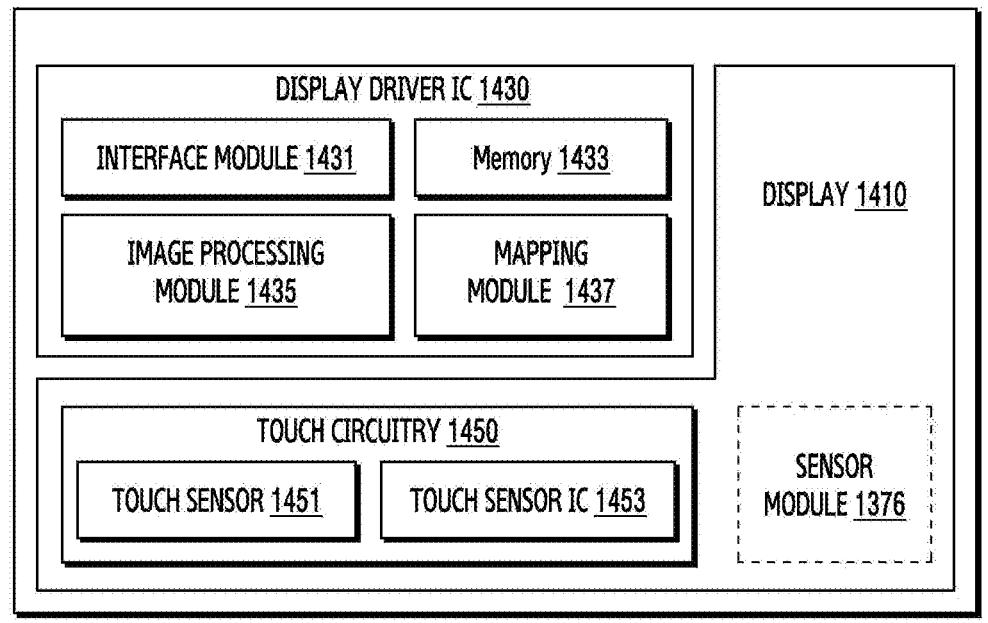
FIG. 14 is a block diagram of a display module according to various example embodiments.

For example, the display driver circuitry 420 may include at least a portion of a display driver integrated circuit (DDI) 1430 of FIG. 14. For example, the display driver circuitry 420 may be operably coupled with the display panel 110. For example, the display driver circuitry 420 being operably coupled with the display panel 110 may indicate that the display driver circuitry 420 is connected to the display panel 110. For example, the display driver circuitry 420 being operably coupled with the display panel 110 may indicate that the display panel 110 is controlled by the display driver circuitry 420. However, it is not limited thereto.

For example, the display panel 110 may include at least a portion of the display 1410 of FIG. 14.

For example, the display driver circuitry 420 may execute operations to reduce the afterimage occurring on the display panel 110 and/or operations to reduce the flickering occurring on the display panel 110. For example, the display driver circuitry 420 may provide the first signal to the processor 410 to reduce the afterimage occurring on the display panel 110. The first signal may be referred to as an image retransmission request. As a non-limiting example, the first signal may be referred to as a repeat request. As a non-limiting example, the first signal may be referred to as a short tearing effect (TE) signal (or a short repeat request). For example, the display driver circuitry 420 may provide the second signal to the processor 410 to reduce the flickering occurring on the display panel 110. The second signal may be referred to as an image transmission request. As a non-limiting example, the second signal may be referred to as a repeat request. As a non-limiting example, the second signal may be referred to as a long tearing effect (TE) signal (or a long repeat request). Operations for providing the first signal to the processor 410 and operations for providing the second signal to the processor 410 may be exemplified in the description of FIGS. 5 to 12.

Figure 5:
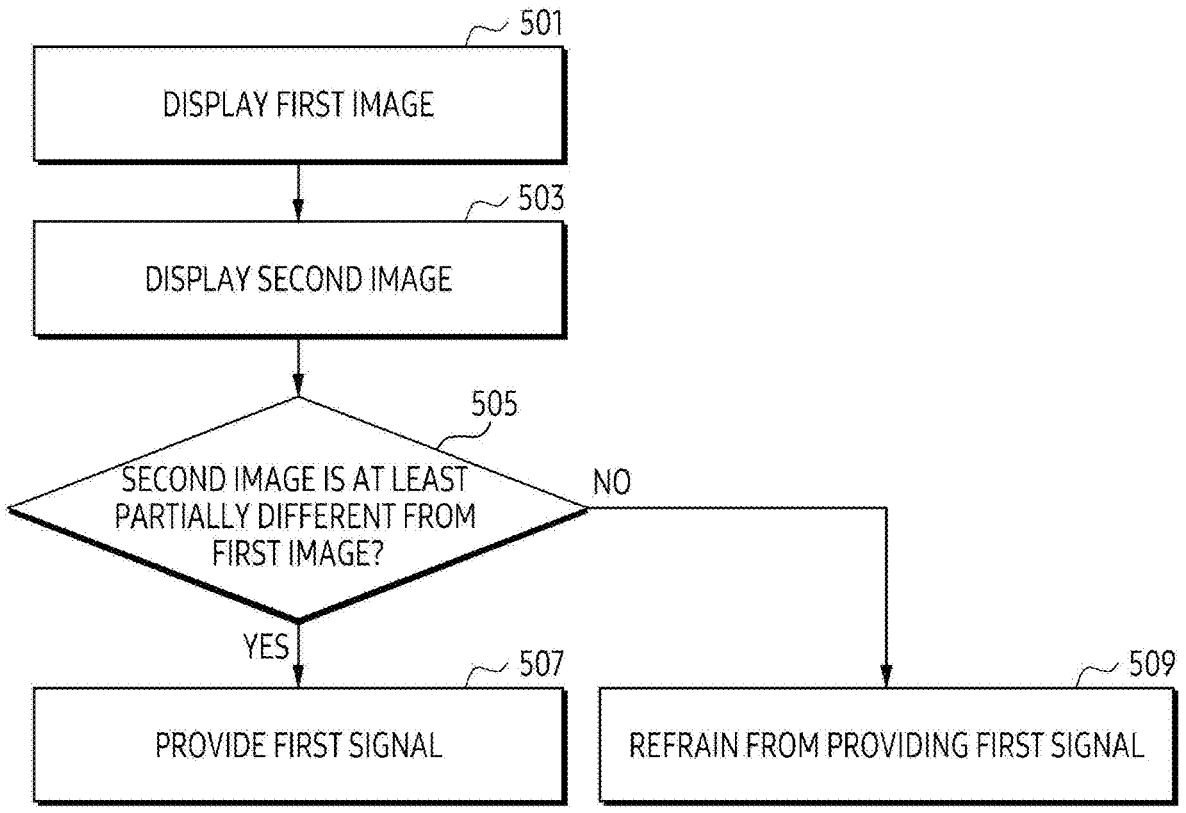
FIG. 5 illustrates an exemplary method for providing a first signal based on a second image that is at least partially different from a first image.

FIG. 5 illustrates an exemplary method for providing a first signal based on a second image that is at least partially different from a first image.

Referring to FIG. 5, in operation 501, the display driver circuitry 420 may display a first image received from the processor 410 through the first interface 415 on the display panel 110. The first image may be transmitted from the processor 410 to the display driver circuitry 420 based on the video mode of the DSI. When the display driver circuitry 420 includes a graphic random access memory (GRAM), the first image may be transmitted while the GRAM is deactivated.

The first image may be transmitted from the processor 410 to the display driver circuitry 420 after a synchronization between at least a portion of operations of the processor 410 related to displaying of an image and at least a portion of operations of the display driver circuitry 420 related to the displaying of the image is obtained from the processor 410 based on the synchronization signal provided to the display driver circuitry 420.

The synchronization signal may be provided from the processor 410 to the display driver circuitry 420 to synchronize a timing of a horizontal synchronization signal for the processor 410 with a timing of a horizontal synchronization signal for the display driver circuitry 420. The synchronization signal may be provided from the processor 410 to the display driver circuitry 420 to synchronize a timing of a vertical synchronization signal for the processor 410 with a timing of a vertical synchronization signal for the display driver circuitry 420. The synchronization signal may be provided from the processor 410 to the display driver circuitry 420 to synchronize a timing of a light emitting synchronization signal for the processor 410 with a timing of a light emitting synchronization signal for the display driver circuitry 420. Each of the light emitting synchronization signal for the processor 410 and the light emitting synchronization signal for the display driver circuitry 420 may be used to indicate a timing of a light emitting signal provided from the display driver circuitry 420 to the display panel 110 or to indicate a timing of a light emitting interval. For example, a timing of the light emitting synchronization signal for the processor 410 and/or a timing of the vertical synchronization signal for the processor 410 may be a timing capable of executing an image transmission from the processor 410 to the display driver circuitry 420. The synchronization signal may indicate or notify the display driver circuitry 420 of the timing of the horizontal synchronization signal for the processor 410, the timing of the vertical synchronization signal for the processor 410, and/or the timing of the light emitting synchronization signal for the processor 410 via a period of the synchronization signal and/or a waveform (e.g., pulse width) of the synchronization signal.

In operation 503, the display driver circuitry 420 may display, on the display panel 110, a second image that is subsequent to the first image and received from the processor 410 through the first interface 415. The second image may be transmitted from the processor 410 to the display driver circuitry 420 based on the video mode of the DSI. When the display driver circuitry 420 includes the GRAM, the second image may be transmitted while the GRAM is deactivated.

The second image may be transmitted from the processor 410 to the display driver circuitry 420 after the synchronization is obtained based on the synchronization signal provided to the display driver circuitry 420.

Figure 10:
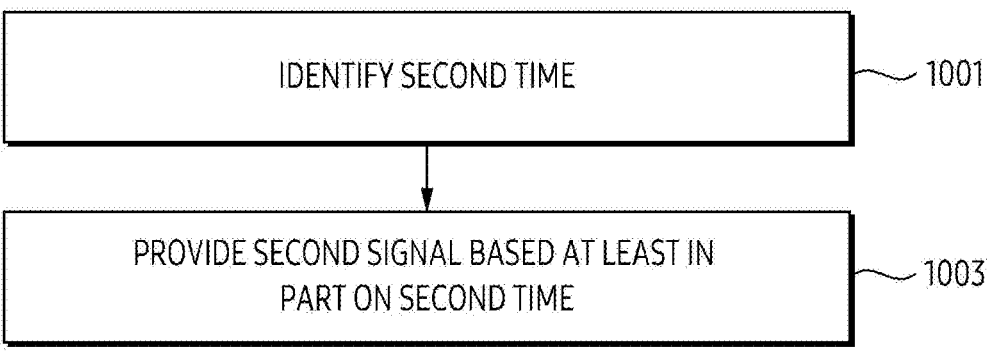
FIG. 10 illustrates an exemplary method for providing a second signal before a second image is received based on a second time.

In operation 505, while the second image is displayed on the display panel 110, the display driver circuitry 420 may identify whether the second image is at least partially different from the first image, based on the first image being maintained on the display panel 110 for a time duration longer than a reference time duration (referred to as a first reference time duration in a description of FIG. 10) in accordance with at least one displaying of the first image including the displaying of the first image.

For example, the at least one display including the displaying of the first image may indicate that another displaying of the first image may have been executed on the display panel 110 before the displaying of the first image executed in operation 501. For example, the displaying of the first image executed in operation 501 may include re-displaying of the first image.

For example, the first image being maintained on the display panel 110 may indicate that the at least one display is continuously executed. For example, the first image being maintained on the display panel 110 may indicate that when the at least one display includes multiple displays of the first image, displaying of another image that is at least partially different from the first image is not executed between the multiple displays.

For example, the display driver circuitry 420 may execute operation 507 on a condition that the second image is at least partially different from the first image and execute operation 509 on a condition that the second image is identical to the first image. For example, when the second image is identical to the first image, a probability of the afterimage occurring on the display panel 110 decreases, so the display driver circuitry 420 may identify whether the second image is at least partially different from the first image.

The identification may be executed on a condition that an image is maintained on the display panel 110 for a time duration longer than the reference time duration. However, it is not limited thereto. The identification may be executed on a condition that a new image (e.g., the second image) is received from the processor 410.

In operation 507, the display driver circuitry 420 may provide the first signal for requesting the processor 410 to retransmit the second image through the second interface 425, in response to the second image that is at least partially different from the first image. For example, the first signal may be provided from the display driver circuitry 420 to the processor 410 to reduce occurrence of the afterimage. Providing the first signal may be exemplified within the description of FIG. 6.

Figure 6:
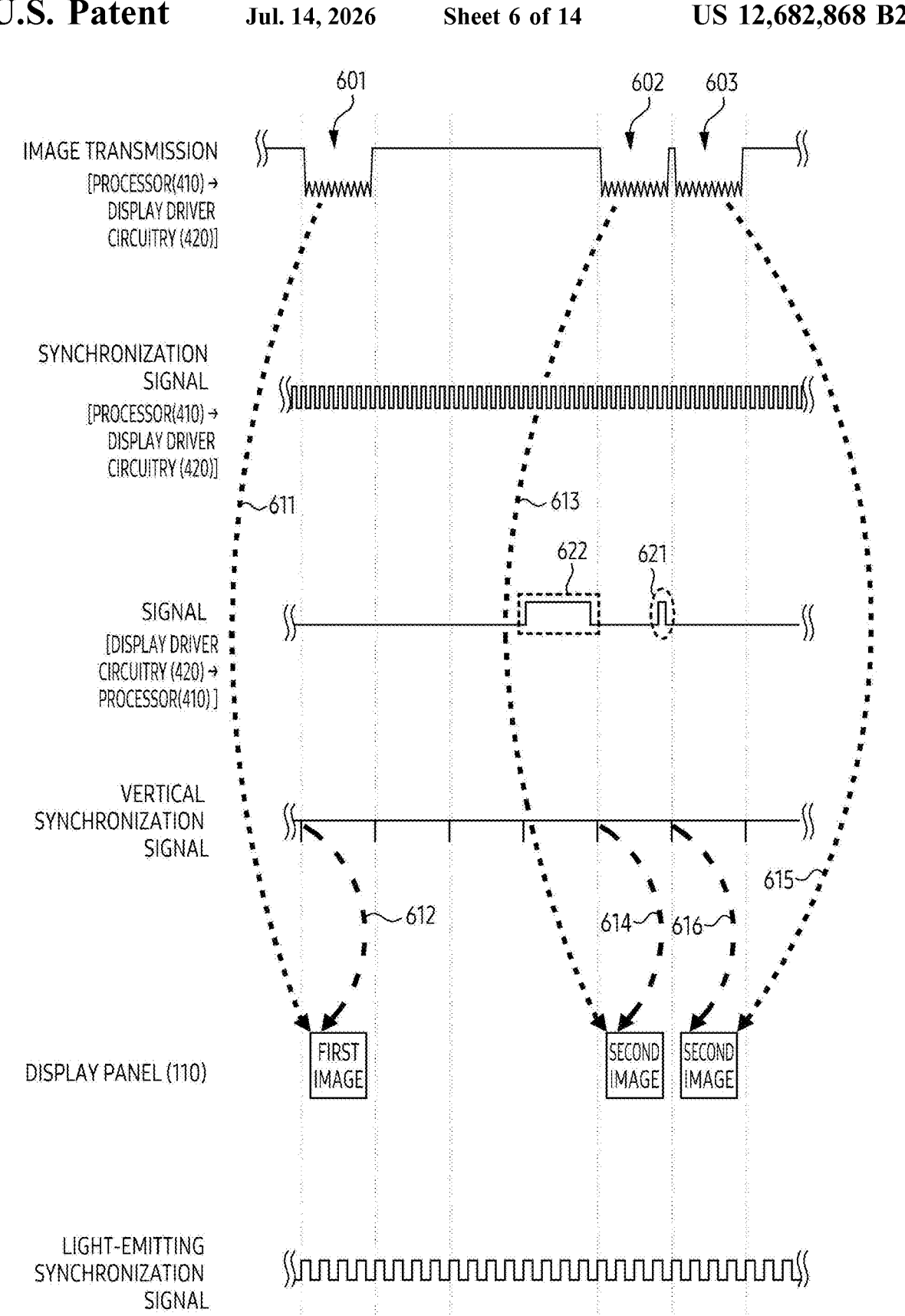
FIG. 6 illustrates an exemplary method for executing providing of a first signal and/or providing of a second signal.

FIG. 6 illustrates an exemplary method for executing providing of a first signal and/or providing of a second signal.

Referring to FIG. 6, the processor 410 may transmit the first image to the display driver circuitry 420 through the first interface 415, as in a state 601. The display driver circuitry 420 may display, on the display panel 110, the first image received from the processor 410 through the first interface 415, as indicated by arrows 611. For example, the displaying of the first image may be executed based on a vertical synchronization signal for the display driver circuitry 420, as indicated by arrows 612. The vertical synchronization signal for the display driver circuitry 420 may be synchronized with the vertical synchronization signal for the processor 410, based on the synchronization signal.

After displaying of the first image the display panel 110, the processor 410 may transmit the second image to the display driver circuitry 420 through the first interface 415, as in a state 602. The display driver circuitry 420 may display, on the display panel 110, the second image received from the processor 410 through the first interface 415, as indicated by arrows 613. For example, the displaying of the second image may be executed based on the vertical synchronization signal for the display driver circuitry 420, as indicated by arrows 614.

For example, while the second image is displayed on the display panel 110, the display driver circuitry 420 may identify whether the second image is at least partially different from the first image, based on the first image maintained on the display panel 110 for a time duration longer than the reference time duration in accordance with the at least one displaying of the first image including the displaying of the first image.

Identifying that the second image is at least partially different from the first image may be executed through various methods.

For example, the display driver circuitry 420 may identify whether the second image is at least partially different from the first image by comparing cyclic redundancy check (CRC) (or checksum) data for the first image with CRC data for the second image. For example, the display driver circuitry 420 may identify that the second image is at least partially different from the first image based on the CRC data for the second image that is at least partially different from the CRC data for the first image. For example, when the first signal (e.g., a first signal 621 to be illustrated below) is executed based on a comparison between the CRC data for the first image and the CRC data for the second image, the first signal may be provided to the processor 410 at an end timing of an activation period of a vertical synchronization signal for displaying the second image. However, it is not limited thereto.

For example, the display driver circuitry 420 may sequentially execute a comparison between the first image and the second image from a comparison between data indicating an initial horizontal line from among a plurality of horizontal lines of the first image and data indicating an initial horizontal line from among a plurality of horizontal lines of the second image toward a comparison between data indicating a last horizontal line from among the plurality of horizontal lines of the first image and data indicating a last horizontal line from among the plurality of horizontal lines of the second image. In response to identifying a portion of the second image different from a portion of the first image in accordance with the comparison, the display driver circuitry 420 may cease the comparison and provide a first signal 621 to the processor 410 through the second interface 425. Providing data respectively indicating the plurality of horizontal lines of the first image used for the comparison, data respectively indicating the plurality of horizontal lines of the second image used for the comparison, and the first signal 621 may be exemplified in a description of FIG. 7.

Figure 7:
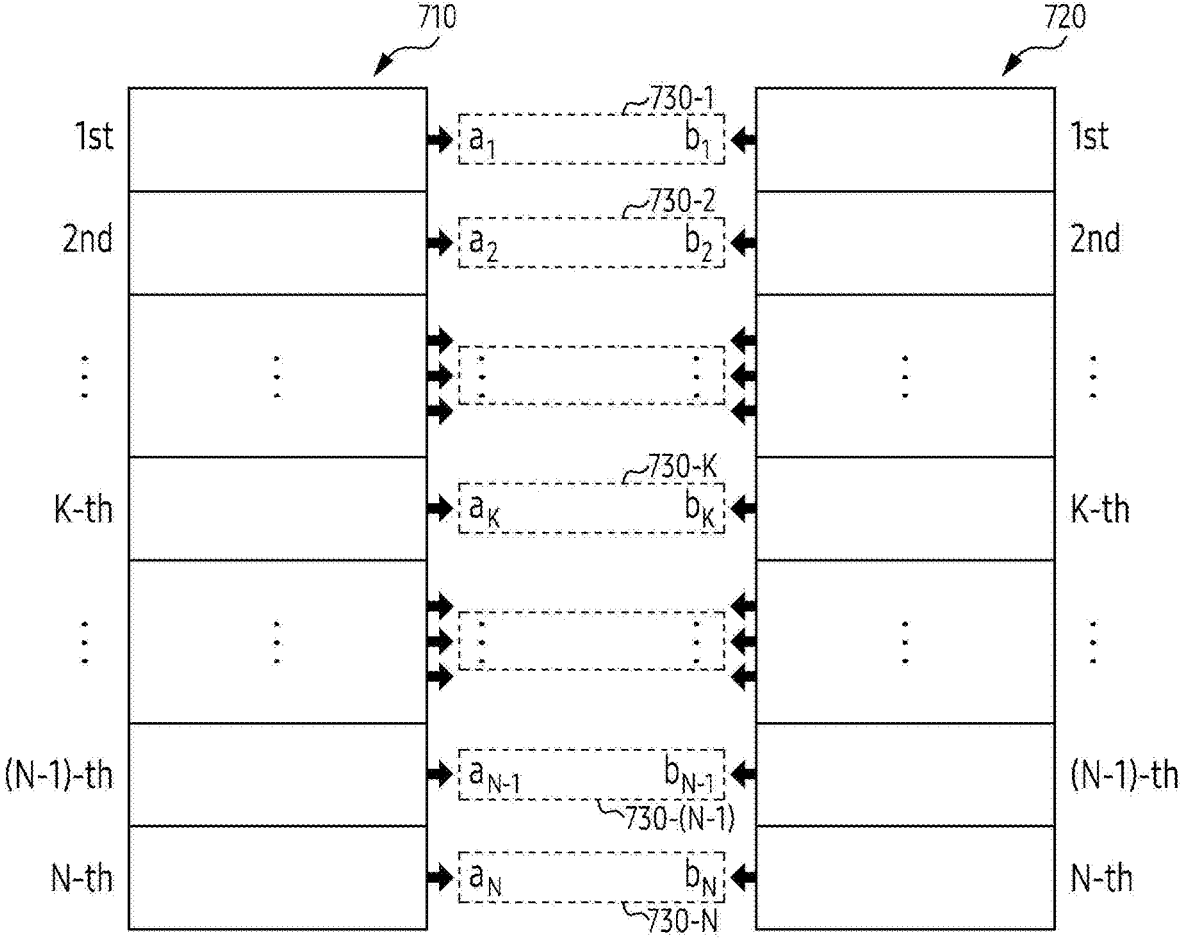
FIG. 7 illustrates an exemplary method for comparing a first image and a second image.

FIG. 7 illustrates an exemplary method for comparing a first image and a second image.

Referring to FIG. 7, a first image 710 may include a plurality of horizontal lines including a first horizontal line, a second horizontal line, . . . , a K-th horizontal line (K is a natural number greater than or equal to 1 and less than or equal to N), . . . , an N–1-th horizontal line, and an N-th horizontal line (N is a natural number). The display driver circuitry 420 may obtain or identify data $a_1$ indicating the first horizontal line of the first image 710, data $a_2$ indicating the second horizontal line of the first image 710, . . . , data $a_k$ indicating the K-th horizontal line of the first image

710, . . . , data $a_{N-1}$ indicating the N–1th horizontal line of the first image 710, and data $a_N$ indicating the N-th horizontal line of the first image 710, as data indicating each of the plurality of horizontal lines of the first image used for the comparison. For example, each of data $a_1$, data $a_2$, . . . , data $a_k$, . . . , data $a_{N-1}$, and data $a_N$ may be configured with sum, mean, or variance of values indicating each of the first horizontal line of the first image 710, the second horizontal line of the first image 710, . . . , the K-th horizontal line of the first image 710, . . . , the N–1-th horizontal line of the first image 710, and the N-th horizontal line of the first image 710.

A second image 720 may include the plurality of horizontal lines including the first horizontal line, the second horizontal line, . . . , the K-th horizontal line, . . . , the N–1-th horizontal line, and the N-th horizontal line. The display driver circuitry 420 may obtain or identify data $b_1$ indicating the first horizontal line of the second image 720, data $b_2$ indicating the second horizontal line of the second image 720, . . . , data $b_k$ indicating the K-th horizontal line of the second image 720, . . . , data $b_{N-1}$ indicating the N–1th horizontal line of the second image 720, and data by indicating the N-th horizontal line of the second image 720, as data indicating each of the plurality of horizontal lines of the second image used for the comparison. For example, each of data $b_1$, data $b_2$, . . . , data $b_k$, . . . , data $b_{N-1}$, and data by may be configured with sum, mean, or variance of values indicating each of the first horizontal line of the second image 720, the second horizontal line of the second image 720, . . . , the K-th horizontal line of the second image 720, . . . , the N–1-th horizontal line of the second image 720, and the N-th horizontal line of the second image 720.

For example, the display driver circuitry 420 may sequentially execute a comparison 730-1 between data $a_1$ and data $b_1$, a comparison 730-2 between data $a_1$ and data $b_2$, . . . , a comparison 730-K between data $a_k$ and data $b_k$, . . . , a comparison 730-(N–1) between data $a_{N-1}$ and data $b_{N-1}$, and a comparison 730-N between data an and data by. For example, the display driver circuitry 420 may cease the execution and provide a first signal 621 to the processor 410 via the second interface 425, in response to identifying the horizontal line of the second image 720 different from the horizontal line of the first image 710 in accordance with the sequential execution. A timing at which the first signal 621 is provided to the processor 410 via the second interface 425 may vary in accordance with a position of the horizontal line of the second image different from the horizontal line of the first image, according to this operation.

For example, when data $a_1$ to data $a_{k-1}$ are identical to data $b_1$ to data $b_{k-1}$, and data $a_k$ is different from data $b_k$, the display driver circuitry 420 may identify data $a_k$ different from data $b_k$ by executing the comparison 730-1 to the comparison 730-K. The display driver circuitry 420 may provide the first signal 621 to the processor 410 in response to the identification, and may cease to execute a comparison 730-(K+1) to the comparison 730-N in response to the identification. For another example, when data $a_1$ to data $a_k$ are identical to data $b_1$ to data $b_k$, and data $a_{k+1}$ is different from data $b_{k+1}$, the display driver circuitry 420 may identify data $a_{k+1}$ different from data $a_{k+1}$ by executing the comparison 730-1 to the comparison 730-(K+1). The display driver circuitry 420 may provide the first signal 621 to the processor 410 in response to the identification, and may cease to execute a comparison 730-(K+2) to the comparison 730-N in response to the identification.

Referring back to FIG. 6, the display driver circuitry 420 may provide the first signal 621 to the processor 410, based on identifying that the second image is at least partially different from the first image. The first signal 621 may be provided to the processor 410, after a synchronization between at least a portion of operations of the processor 410 related to displaying of an image and at least a portion of operations of the display driver circuitry 420 related to the displaying of the image is obtained from the processor 410 based on the synchronization signal provided to the display driver circuitry 420.

The first signal 621 may be provided to the processor 410 to reduce occurrence of the afterimage on the display panel 110. The first signal 621 may be provided to the processor 410 to request the retransmission of the second image for reducing the occurrence of the afterimage. As a non-limiting example, the display driver circuitry 420 may provide the first signal 621 to the processor 410 via the second interface 425, before an end timing of a time interval for the displaying of the second image (e.g., end timing of the vertical synchronization signal for the display driver circuitry 420). For example, the display driver circuitry 420 may provide the first signal 621 to the processor 410, based on the light emitting synchronization signal for the display driver circuitry 420, included within the time interval.

For example, the processor 410 may execute the retransmission of the second image in response to the first signal 621. For example, in response to the first signal 621, the processor 410 may transmit again the second image to the display driver circuitry 420 via the first interface 415, as in a state 603.

The display driver circuitry 420 may display again, on the display panel 110, the second image received again from the processor 410 through the first interface 415, as indicated by arrows 615. For example, the re-displaying of the second image may be executed based on the vertical synchronization signal for the display driver circuitry 420, as indicated by arrows 616.

The display driver circuitry 420 may cease to provide the first signal 621 to the processor 410, in response to the second image received again from the processor 410 through the first interface 415, as in the state 603.

FIG. 6 illustrates an example in which the processor 410 executes the transmission of the second image indicated by the state 602 and the retransmission of the second image indicated by the state 603 based on the vertical synchronization signal for the processor 410, but the transmission of the second image and the retransmission of the second image may be executed based on the light emitting synchronization signal for the processor 410.

Referring back to FIG. 5, in operation 509, the display driver circuitry 420 may bypass or refrain from providing the first signal to the processor 410 through the second interface 425, in response to the second image that is identical to the first image. For example, since the second image being identical to the first image indicates that a probability of the afterimage occurring on the display panel 110 is relatively low, the display driver circuitry 420 may bypass or refrain from providing the first image.

Although not illustrated in the description of FIGS. 5 to 6, the display driver circuitry 420 may bypass or refrain from identifying whether the second image is at least partially different from the first image based on the first image maintained on the display panel 110 for a time duration shorter than or equal to the reference time duration. For example, since the time duration being shorter than or equal to the reference time duration indicates that a probability of the afterimage occurring on the display panel 110 is relatively low, the display driver circuitry 420 may bypass or refrain from identifying whether the second image is at least partially different from the first image.

Although not illustrated in the description of FIGS. 5 to 6, the display driver circuitry 420 may bypass or refrain from providing the first signal based on the first image maintained on the display panel 110 for the time duration shorter than or equal to the reference time duration. For example, since the time duration being shorter than or equal to the reference time duration indicates that a probability of the afterimage occurring on the display panel 110 is relatively low, the display driver circuitry 420 may bypass or refrain from providing the first signal.

Referring back to FIG. 4, the display driver circuitry 420 may provide the second signal to the processor 410 to reduce the flickering occurring on the display panel 110. For example, providing the second signal to the processor 410 may be included in at least a portion of the operations exemplified in the description of FIG. 5, or may be executed independently of at least a portion of the operations exemplified in the description of FIG. 5. Providing the second signal may be exemplified within the description of FIG. 8.

Figure 8:
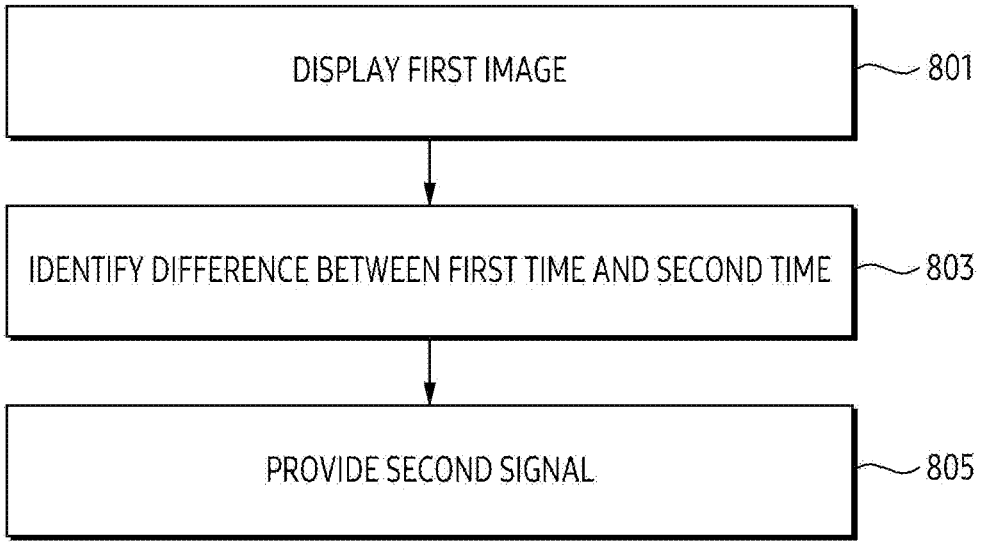
FIG. 8 illustrates an exemplary method for providing a second signal before a second image is received based on a difference between a first time and a second time.

FIG. 8 illustrates an exemplary method for providing a second signal before a second image is received based on a difference between a first time and a second time.

Referring to FIG. 8, in operation 801, the display driver circuitry 420 may display the first image. Operation 801 may correspond to operation 501 of FIG. 5.

In operation 803, the display driver circuitry 420 may identify a difference between the first time and the second time.

For example, before the second image is received from the processor 410 through the first interface 415, the display driver circuitry 420 may identify the first time between displaying on the display panel 110 executed before the displaying of the first image and the displaying of the first image. The displaying on the display panel 110 may be displaying of the first image or displaying of an image that is at least partially different from the first image. The first time may correspond to a refresh rate of the displaying on the display panel 110 that was executed prior to the displaying of the first image executed in operation 801.

For example, the display driver circuitry 420 may identify the second time elapsed after the displaying of the first image. For example, the second time may correspond to a refresh rate of the displaying of the first image at the current timing.

For example, as exemplified in the description of FIG. 3, since a sudden change in a refresh rate may cause flickering on the display panel 110, the display driver circuitry 420 may identify a difference between the first time and the second time.

In operation 805, the display driver circuitry 420 may provide the second signal to the processor 410 through the second interface 425, based at least in part on the difference. Although not illustrated in FIG. 8, in response to the difference that is shorter than or equal to the other reference time duration, the display driver circuitry 420 may bypass or refrain from providing the second signal and maintain identifying the second time.

For example, in response to the difference that is longer than another reference time duration (referred to as a second reference time duration in the description of FIG. 10) distinct from the reference time duration, the display driver circuitry 420 may provide the processor 410, via the second interface 425, with the second signal for requesting an image transmission from the processor 410 to the display driver circuitry 420. A length of the other reference time duration may be identical to or different from a length of the reference time duration.

For example, the display driver circuitry 420 may identify whether the image transmission is executed by the processor 410, while the second signal is being provided. For example, the display driver circuitry 420 may maintain providing the second signal before the image transmission is executed. For example, the display driver circuitry 420 may cease providing the second signal to the processor 410 through the second interface 425, in response to the image transmission executed by the processor 410. Operations related to the second signal may be exemplified within the description of FIG. 6.

Referring to FIG. 6, the display driver circuitry 420 may identify the second time after displaying the first image on the display panel 110 and identify the difference between the first time and the second time. In response to identifying that the difference is longer than the other reference time duration, the display driver circuitry 420 may provide, via the interface 425, to the processor 410, a second signal 622 for requesting the image transmission from the processor 410 to the display driver circuitry 420. Since a relatively large difference between the first time and the second time may indicate that a change of a refresh rate is relatively large, the relatively large difference between the first time and the second time may indicate that a probability of occurrence of the flickering is relatively high. For example, the second signal 622 may be provided to the processor 410 to reduce the flickering. For example, the second signal 622 may be provided to the processor 410 after a synchronization between at least a portion of operations of the processor 410 related to displaying of an image and at least a portion of operations of the display driver circuitry 420 related to the displaying of the image is obtained from the processor 410 based on the synchronization signal provided to the display driver circuitry 420.

As a non-limiting example, the second signal 622 may be provided to the processor 410 in a sleep state changed from a wake-up state after transmitting the first image as in the state 601. For example, the second signal 622 may be provided based on a time of change from the sleep state to the wake-up state. For example, in case that the time corresponds to a period of the vertical synchronization signal for the display driver circuitry 420, the second signal 622 may be provided within a time interval of a vertical synchronization signal before a vertical synchronization signal targeted (or identified) by the display driver circuitry 420 for image reception. For example, in case that the time corresponds to time intervals (or time periods) of the light emitting synchronization signal for the display driver circuitry 420, the second signal 622 may be provided after the one or more time intervals and before a start timing of a light emitting synchronization signal targeted (or identified) by the display driver circuitry 420 for image reception. For example, the processor may change a state of the processor 410 from the sleep state to the wake-up state in response to the second signal 622, obtain or render an image (e.g., the second image) to be transmitted to the display driver circuitry 420 in response to the change, and transmit the image (e.g., the second image) to the display driver circuitry 420 through the first interface 415. For example, the transmission of the image is executed through the changing from the sleep state to the wake-up state and obtaining of the image, the display driver circuitry 420 may maintain providing the second signal 622 to the processor 410 until the image (e.g., the second image) is received, as illustrated in FIG. 6.

In response to the second signal 622, the display driver circuitry 420 may receive the second image transmitted from the processor 410 through the first interface 415 as in the state 602. For example, the display driver circuitry 420 may display the second image on the display panel 110, as indicated by arrows 613.

Although FIG. 6 illustrates an example in which the second image different from the first image is transmitted from the processor 410 in response to the second signal 622, the processor 410 may transmit again the first image to the display driver circuitry 420 in response to the second signal 622.

Meanwhile, the display driver circuitry 420 may maintain providing the second signal 622 until the second image is received and may cease to provide the second signal 622 in response to the reception of the second image. Maintaining providing of the second signal 622 to the processor 410 until an image is received from the processor 410 will be exemplified through FIG. 9.

Figure 9:
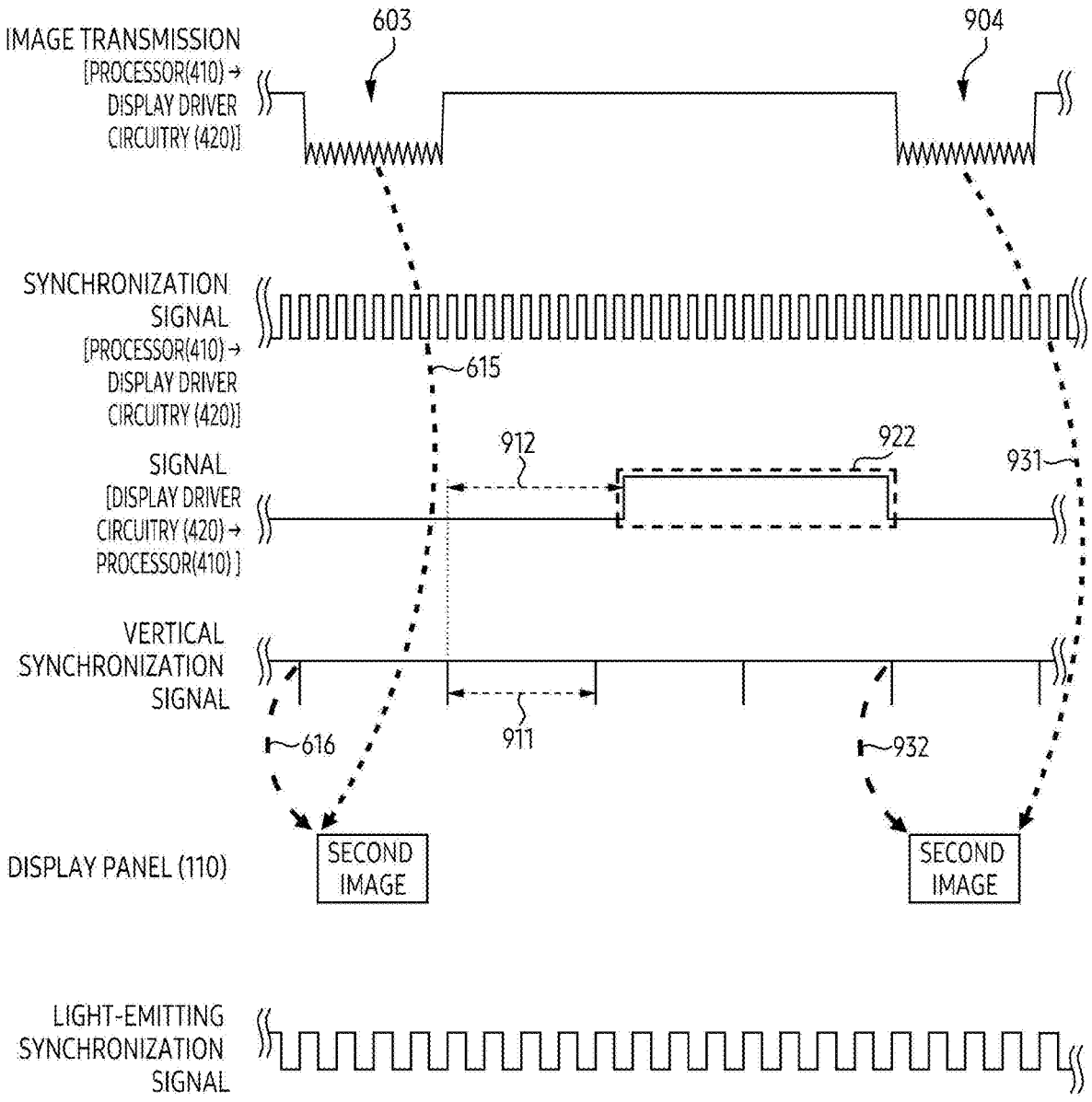
FIG. 9 illustrates an exemplary method for maintaining providing of a second signal before an image transmission from a processor to display driver circuitry is executed.

FIG. 9 illustrates an exemplary method for maintaining providing of a second signal before an image transmission from a processor to display driver circuitry is executed.

Referring to FIG. 9, the processor 410 may retransmit the second image to the display driver circuitry 420 through the first interface 415, as in the state 603.

The display driver circuitry 420 may display again, on the display panel 110, the second image received again from the processor 410 through the first interface 415, as indicated by arrows 615. For example, the re-display of the second image may be executed based on the vertical synchronization signal for the display driver circuitry 420, as indicated by arrows 616.

For example, the display driver circuitry 420 may identify a second time (e.g., time 911 or time 912) elapsed after re-displaying of the second image on the display panel 110, identify a first time between the displaying of the second image executed in accordance with the state 602 (not illustrated in FIG. 9) and the re-displaying of the second image executed in accordance with the state 603, and identify the difference between the first time and the second time.

In response to identifying that the difference is longer than the other reference time duration, the display driver circuitry 420 may provide, through the interface 425, to the processor 410, a second signal 922 for requesting the image transmission from the processor 410 to the display driver circuitry 420. For example, the display driver circuitry 420 may maintain providing the second signal 922, until an image is received from the processor 410 through the first interface 415, as illustrated in FIG. 9.

Meanwhile, in response to the second signal 922 provided from the display driver circuitry 420 through the second interface 425, the processor 410 may retransmit the second image to the display driver circuitry 420 through the first interface 415 to execute displaying of an image on the display panel 110, as indicated by a state 904.

In response to the retransmission of the second image, the display driver circuitry 420 may cease providing the second signal 922.

The display driver circuitry 420 may display again, on the display panel 110, the second image transmitted again from the processor 410 through the first interface 415, as indicated by arrows 931. For example, the re-displaying of the second image may be executed based on the vertical synchronization signal for the display driver circuitry 420, as indicated by arrows 932.

Referring back to FIG. 4, the display driver circuitry 420 may provide the second signal to the processor 410 to maintain an image displayed on the display panel 110. For example, displaying on the display panel 110 being ceased due to the processor 410 in the sleep state may reduce quality of a service provided using the display 405. The display driver circuitry 420 may provide the second signal to the processor 410 for the quality of the service. For example, providing the second signal to the processor 410 may be included in at least a portion of the operations exemplified in the description of FIG. 5, may be included in at least a portion of the operations exemplified in the description of FIG. 8, or may be executed independently of at least a portion of the operations exemplified in the description of FIG. 5 and FIG. 8. Providing the second signal may be exemplified within the description of FIG. 10.

FIG. 10 illustrates an exemplary method for providing a second signal before a second image is received based on a second time.

Referring to FIG. 10, in operation 1001, the display driver circuitry 420 may identify the second time. Operation 1001 may correspond to at least a portion of operation 803 of FIG. 8.

In operation 1003, the display driver circuitry 420 may identify whether the second time elapsed after the displaying of the first image is longer than a third reference time duration. For example, the identification may be executed while the processor 410 is in the sleep state. However, it is not limited thereto. A length of the third reference time duration may be identical to a length of the first reference time duration and/or a length of the second reference time duration, or may be different from the length of the first reference time duration and the length of the second reference time duration.

For example, the display driver circuitry 420 may compare the second time and the third reference time duration independently of whether the difference between the first time and the second time is longer than the second reference time duration.

For example, based on the second time being shorter than or equal to the third reference time duration, the display driver circuitry 420 may bypass or refrain from providing the second signal and maintain identifying the second time.

For example, the display driver circuitry 420 may provide the second signal to the processor 410 through the second interface 425, based on the second time longer than the third reference time duration. For example, the second signal may be transmitted to maintain an image on the display panel 110. For example, the processor 410 may change a state of the processor 410 from the sleep state to the wake-up state in response to the second signal, obtain or render an image (e.g., the second image) to be transmitted to the display driver circuitry 420 in response to the change, and transmit the image (e.g., the second image) to the display driver circuitry 420 through the first interface 415. For example, since transmitting of the image (e.g., the second image) is executed through the changing from the sleep state to the wake-up state and obtaining the image (e.g., the second image), the display driver circuitry 420 may maintain providing the second signal to the processor 410 until the image is received. For example, the display driver circuitry 420 may cease to provide the second signal to the processor 410 in response to receiving the image (e.g., the second image).

As described above, the electronic device 100 may reduce the occurrence of the afterimage by providing the first signal to the processor 410. The electronic device 100 may reduce the occurrence of the flickering by providing the second signal to the processor 410. As the electronic device 100 provides the second signal to the processor 410, displaying on the display panel 110 being ceased by the processor 410 in the sleep state may be reduced.

The descriptions of FIGS. 8 and 10 indicate providing of the first signal and providing of the second signal, but providing of the second signal may be executed independently of providing of the first signal. Executing providing of the second signal independently from providing of the first signal may be exemplified in the description of FIGS. 11 and 12.

Figure 11:
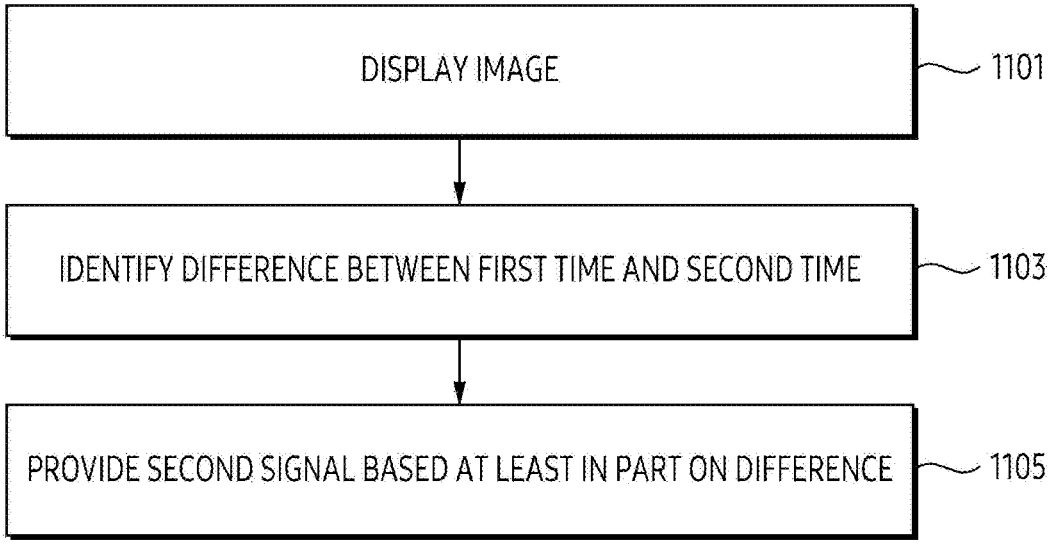
FIG. 11 illustrates an exemplary method for providing a second signal based on a difference between a first time and a second time.

FIG. 11 illustrates an exemplary method for providing a second signal based on a difference between a first time and a second time.

Referring to FIG. 11, in operation 1101, the display driver circuitry 420 may display, on the display panel 110, an image received from the processor 410 through the first interface 415.

In operation 1103, the display driver circuitry 420 may identify a difference between a first time and a second time.

For example, the display driver circuitry 420 may identify the first time between displaying on the display panel 110 that was executed before the displaying of the image executed in operation 1101 and the displaying of the image executed in operation 1101. For example, identifying the first time may be executed in response to the reception of the image.

For example, the display driver circuitry 420 may identify the second time elapsed after the displaying of the image executed in operation 1101, and identify a difference between the first time and the second time. For example, the display driver circuitry 420 may identify whether the difference is longer than the second reference time duration. For example, on a condition that the difference is shorter than or equal to the second reference time duration, identifying the difference may be maintained. For example, identifying the difference may be maintained until the difference becomes longer than the second reference time duration, unless new image reception is executed from the processor 410. For example, identifying the difference may be ceased in response to receiving another image from the processor 410 before the difference becomes longer than the second reference time duration.

In operation 1105, the display driver circuitry 420 may provide the second signal to the processor 410 through the second interface 425, based at least in part on the difference. For example, in response to the difference longer than the second reference time duration, the display driver circuitry 420 may provide, through the second interface 425, to the display driver circuitry 420, the second signal for requesting an image transmission from the processor 410 to the display driver circuitry 420.

As described above, the electronic device 100 may reduce occurrence of the flickering on the display panel 110, by providing the second signal to the processor 410 based on the difference between the first time and the second time.

Figure 12:
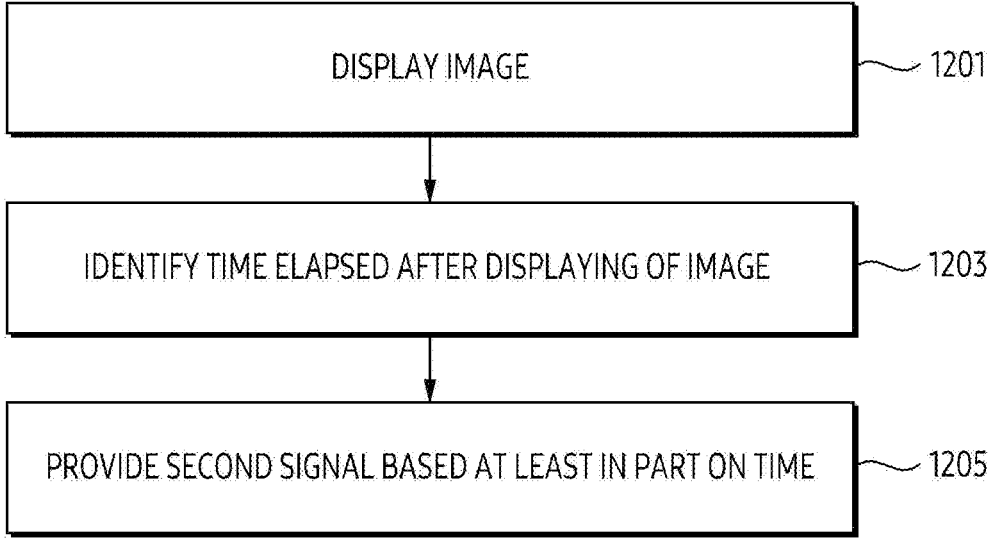
FIG. 12 illustrates an exemplary method for providing a second signal based on a time elapsed after displaying of an image.

FIG. 12 illustrates an exemplary method for providing a second signal based on a time elapsed after displaying of an image.

Referring to FIG. 12, in operation 1201, the display driver circuitry 420 may display, on the display panel 110, an image received from the processor 410 through the first interface 415.

In operation 1203, the display driver circuitry 420 may identify a time (e.g., the second time) elapsed after the displaying of the image executed in operation 1201. For example, the display driver circuitry 420 may identify whether the time is longer than the third reference time duration. For example, on a condition that the time is shorter than or equal to the third reference time duration, identifying of the time may be maintained. For example, identifying of the time may be maintained until the time becomes longer than the third reference time duration, unless new image reception is executed from the processor 410. For example, in response to receiving another image from the processor 410 before the time becomes longer than the third reference time duration, identifying of the time may be ceased.

In operation 1205, the display driver circuitry 420 may provide the second signal to the processor 410 through the second interface 425 based at least in part on the time. For example, in response to the time longer than the third reference time duration, the display driver circuitry 420 may provide, through the second interface 425, to the processor 410, the second signal for requesting an image transmission from the processor 410 to the display driver circuitry 420.

As described above, the electronic device 100 may maintain displaying of an image on the display panel 110, by providing the second signal to the processor 410 based on the time.

FIG. 13 is a block diagram illustrating an electronic device 1301 in a network environment 1300 according to various embodiments. Referring to FIG. 13, the electronic device 1301 in the network environment 1300 may communicate with an electronic device 1302 via a first network 1398 (e.g., a short-range wireless communication network), or at least one of an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In some embodiments, at least one of the components (e.g., the connecting terminal 1378) may be omitted from the electronic device 1301, or one or more other components may be added in the electronic device 1301. In some embodiments, some of the components (e.g., the sensor module 1376, the camera module 1380, or the antenna module 1397) may be implemented as a single component (e.g., the display module 1360).

The processor 1320 may execute, for example, software (e.g., a program 1340) to control at least one other component (e.g., a hardware or software component) of the electronic device 1301 coupled with the processor 1320, and may perform various data processing or computation. According to an embodiment, as at least part of the data processing or computation, the processor 1320 may store a command or data received from another component (e.g., the sensor module 1376 or the communication module 1390 comprising communication circuitry) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 1321. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display module 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323. According to an embodiment, the auxiliary processor 1323 (e.g., the neural processing unit) may include a hardware structure specified for artificial intelligence model processing. An artificial intelligence model may be generated by machine learning. Such learning may be performed, e.g., by the electronic device 1301 where the artificial intelligence is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output sound signals to the outside of the electronic device 1301. The sound output module 1355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1360 may visually provide information to the outside (e.g., a user) of the electronic device 1301. The display module 1360 may include, for example, a display, a hologram device, or a projector and control circuitry to control a corresponding one of the display, hologram device, and projector. According to an embodiment, the display module 1360 may include a touch sensor adapted to detect a touch, or a pressure sensor adapted to measure the intensity of force incurred by the touch.

The audio module 1370 may convert a sound into an electrical signal and vice versa. According to an embodiment, the audio module 1370 may obtain the sound via the input module 1350, or output the sound via the sound output module 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, an HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to an embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The wireless communication module 1392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the mm Wave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the electronic device 1304), or a network system (e.g., the second network 1399). According to an embodiment, the wireless communication module 1392 may support a peak data rate (e.g., 20 Gbps or more) for implementing eMBB, loss coverage (e.g., 1364 dB or less) for implementing mMTC, or U-plane latency (e.g., 0.5 ms or less for each of downlink (DL) and uplink (UL), or a round trip of 13 ms or less) for implementing URLLC.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., a printed circuit board (PCB)). According to an embodiment, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

According to various embodiments, the antenna module 1397 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 or 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In another embodiment, the external electronic device 1304 may include an internet-of-things (IoT) device. The server 1308 may be an intelligent server using machine learning and/or a neural network. According to an embodiment, the external electronic device 1304 or the server 1308 may be included in the second network 1399. The electronic device 1301 may be applied to intelligent services (e.g., smart home, smart city, smart car, or health-care) based on 5G communication technology or IoT-related technology.

FIG. 14 is a block diagram 1400 illustrating the display module 1360 according to various embodiments. Referring to FIG. 14, the display module 1360 may include a display 1410 and a display driver integrated circuit (DDI) 1430 to control the display 1410. The DDI 1430 may include an interface module 1431, memory 1433 (e.g., buffer memory), an image processing module 1435, or a mapping module 1437. The DDI 1430 may receive image information that contains image data or an image control signal corresponding to a command to control the image data from another component of the electronic device 1301 via the interface module 1431. For example, according to an embodiment, the image information may be received from the processor 1320 (e.g., the main processor 1321 (e.g., an application processor)) or the auxiliary processor 1323 (e.g., a graphics processing unit) operated independently from the function of the main processor 1321. The DDI 1430 may communicate, for example, with touch circuitry 1450 or the sensor module 1376 via the interface module 1431. The DDI 1430 may also store at least part of the received image information in the memory 1433, for example, on a frame by frame basis. The image processing module 1435 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1410. The mapping module 1437 may generate a voltage value or a current value corresponding to the image data pre-processed or post-processed by the image processing module 1435.

According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1410 may be driven, for example, based at least in part on the voltage value or the current value such that visual information (e.g., a text, an image, or an icon) corresponding to the image data may be displayed via the display 1410.

According to an embodiment, the display module 1360 may further include the touch circuitry 1450. The touch circuitry 1450 may include a touch sensor 1451 and a touch sensor IC 1453 to control the touch sensor 1451. The touch sensor IC 1453 may control the touch sensor 1451 to sense a touch input or a hovering input with respect to a certain position on the display 1410. To achieve this, for example, the touch sensor 1451 may detect (e.g., measure) a change in a signal (e.g., a voltage, a quantity of light, a resistance, or a quantity of one or more electric charges) corresponding to the certain position on the display 1410. The touch circuitry 1450 may provide input information (e.g., a position, an area, a pressure, or a time) indicative of the touch input or the hovering input detected via the touch sensor 1451 to the processor 1320. According to an embodiment, at least part (e.g., the touch sensor IC 1453) of the touch circuitry 1450 may be formed as part of the display 1410 or the DDI 1430, or as part of another component (e.g., the auxiliary processor 1323) disposed outside the display module 1360.

According to an embodiment, the display module 1360 may further include at least one sensor (e.g., a fingerprint sensor, an iris sensor, a pressure sensor, or an illuminance sensor) of the sensor module 1376 or a control circuit for the at least one sensor. In such a case, the at least one sensor or the control circuit for the at least one sensor may be embedded in one portion of a component (e.g., the display 1410, the DDI 1430, or the touch circuitry 1450)) of the display module 1360. For example, when the sensor module 1376 embedded in the display module 1360 includes a biometric sensor (e.g., a fingerprint sensor), the biometric sensor may obtain biometric information (e.g., a fingerprint image) corresponding to a touch input received via a portion of the display 1410. As another example, when the sensor module 1376 embedded in the display module 1360 includes a pressure sensor, the pressure sensor may obtain pressure information corresponding to a touch input received via a partial or whole area of the display 1410. According to an embodiment, the touch sensor 1451 or the sensor module 1376 may be disposed between pixels in a pixel layer of the display 1410, or over or under the pixel layer.

As described above, an electronic device 100 may comprise a processor 410, a display 405 including display driver circuitry 420 and a display panel 110, a first interface 415 connecting the display driver circuitry 420 to the processor 410, and a second interface connecting the display driver circuitry 420 to the processor 410. According to an embodiment, the display driver circuitry 420 may be configured to display, on the display panel 110, a first image received via the first interface 415 from the processor 410. According to an embodiment, the display driver circuitry 420 may be configured to display, on the display panel 110, a second image, subsequent to the first image, received via the first interface 415 from the processor 410. According to an embodiment, the display driver circuitry 420 may be configured to, while the second image is displayed on the display panel 110, based on the first image being maintained on the display panel 110 during a time duration longer than a reference time duration in accordance with at least one displaying of the first image, identify whether the second image is at least partially different from the first image, wherein the at least one displaying of the first image includes the displaying of the first image. According to an embodiment, the display driver circuitry 420 may be configured to, in response to the second image at least partially different from the first image, provide, via the second interface 425, to the processor 410, a signal for requesting a retransmission of the second image.

According to an embodiment, the display driver circuitry 420 may be configured to, in response to the second image identical to the first image, refrain from providing the signal via the second interface 425 to the processor 410.

According to an embodiment, the processor 410 may be configured to, in response to the signal, execute the retransmission of the second image. According to an embodiment, the display driver circuitry 420 may be configured to display again, on the display panel 110, the second image received via the first interface 415 from the processor 410 in accordance with the retransmission.

According to an embodiment, the display driver circuitry 420 may be configured to, before an end timing of a time interval for the displaying of the second image, provide, via the second interface 425, to the processor 410, the signal.

According to an embodiment, the display driver circuitry 420 may be configured to identify whether the second image is at least partially different from the first image by comparing cyclic redundancy check (CRC) data for the second image with CRC data for the first image.

According to an embodiment, the display driver circuitry 420 may be configured to sequentially execute a comparison between the first image and the second image from a comparison between data indicating an initial horizontal line from among a plurality of horizontal lines of the first image and data indicating an initial horizontal line from among a plurality of horizontal lines of the second image toward a comparison between data indicating a last horizontal line from among the plurality of horizontal lines of the first image and data indicating a last horizontal line from among the plurality of horizontal lines of the second image. According to an embodiment, the display driver circuitry 420 may be configured to, in response to identifying a horizontal line of the second image different from a horizontal line of the first image in accordance with the comparison, cease the comparison, and provide, via the second interface 425, to the processor 410, the signal.

According to an embodiment, a timing at which the signal is provided via the second interface 425 to the processor 410 may vary in accordance with a position of the horizontal line of the second image different from the horizontal line of the first image.

According to an embodiment, data indicating each of the plurality of horizontal lines of the first image used for the comparison may be configured with sum, mean, or variance of values indicating each of the plurality of horizontal lines of the first image. According to an embodiment, data indicating each of the plurality of lines of the second image used for the comparison may be configured with sum, mean, or variance of values indicating each of the plurality of horizontal lines of the second image.

According to an embodiment, the display driver circuitry 420 may be configured to, based on the first image maintained on the display panel 110 during the time duration shorter than or equal to the reference time duration, bypass identifying whether the second image is at least partially different from the first image.

According to an embodiment, the display driver circuitry 420 may be configured to, based on the first image maintained on the display panel 110 during the time duration shorter than or equal to the reference time duration, bypass providing the signal.

According to an embodiment, the display driver circuitry 420 may be configured to, before the second image is received via the first interface 415 from the processor 410, identify a first time between a displaying on the display panel executed before the displaying of the first image and the displaying of the first image. According to an embodiment, the display driver circuitry 420 may be configured to identify a second time elapsed after the displaying of the first image. According to an embodiment, the display driver circuitry 420 may be configured to identify a difference between the first time and the second time. According to an embodiment, the display driver circuitry 420 may be configured to, in response to the difference longer than another reference time duration, provide, via the second interface 425, to the processor 410, another signal for requesting an image transmission from the processor 410 to the display driver circuitry 420.

According to an embodiment, the reference time duration may be a first reference time duration, and the other reference time duration may be a second reference time duration. According to an embodiment, the processor 410 may be configured to, after transmitting the first image via the first interface 415 to the display driver circuitry 420, change a state of the processor 410 from a wake-up state to a sleep state. According to an embodiment, the display driver circuitry 420 may be configured to, while the processor 410 is in the sleep state, identify whether the second time is longer than a third reference time duration. According to an embodiment, the display driver circuitry 420 may be configured to, in response to the second time is longer than the third reference time duration, provide, via the second interface 425, to the processor 410, the signal.

According to an embodiment, the display driver circuitry 420 may be configured to, while the other signal is provided, identify whether the image transmission is executed by the processor 410. According to an embodiment, the display driver circuitry 420 may be configured to, in response to the image transmission executed by the processor 410, cease to provide the other signal via the second interface 425 to the processor 410.

According to an embodiment, the display driver circuitry 420 may be configured to, before the image transmission is executed, maintain to provide the other signal.

According to an embodiment, the display driver circuitry 420 may be configured to, in response to the difference shorter than or equal to the other reference time duration, bypass or refrain from providing the other signal, and maintain identifying the second time.

As described above, according to an embodiment, an electronic device 100 may comprise a processor 410, a display 405 including display driver circuitry 420 and a display panel 110, a first interface 415 connecting the display driver circuitry 420 to the processor 410, and a second interface connecting the display driver circuitry 420 to the processor 410. According to an embodiment, the display driver circuitry 420 may be configured to display, on the display panel 110, an image received via the first interface 415 from the processor 410. According to an embodiment, the display driver circuitry 420 may be configured to identify a first time between a displaying on the display panel executed before the displaying of the image and the displaying of the image. According to an embodiment, the display driver circuitry 420 may be configured to identify a second time elapsed after the displaying of the image. According to an embodiment, the display driver circuitry 420 may be configured to identify a difference between the first time and the second time. According to an embodiment, the display driver circuitry 420 may be configured to, in response to the difference longer than a reference time duration, provide, via the second interface 425, to the processor 410, a signal for requesting an image transmission from the processor 410 to the display driver circuitry 420.

According to an embodiment, the image may be a first image. According to an embodiment, the display driver circuitry 420 may be configured to receive a second image transmitted from the processor 410 through the first interface 415 in accordance with the image transmission according to the signal. According to an embodiment, the display driver circuitry 420 may be configured to display the second image on the display panel 110. According to an embodiment, the display driver circuitry 420 may be configured to, while the second image is displayed on the display panel 110, identify a time duration at which the first image is maintained on the display panel 110 based at least in part on the displaying of the image. According to an embodiment, the display driver circuitry 420 may be configured to, based on the time duration longer than another reference time duration, identify whether the second image is at least partially different from the first image. According to an embodiment, the display driver circuitry 420 may be configured to, in response to the second image that is at least partially different from the first image, provide, through the second interface 425, to the processor 410, another signal for requesting a retransmission of the second image. "Based on" as used herein covers based at least on.

According to an embodiment, the display driver circuitry 420 may be configured to, in response to the second image that is identical to the first image, refrain from providing, through the second interface 425, to the processor 410, the signal.

According to an embodiment, the display driver circuitry 420 may comprise a graphic random access memory (GRAM). The GRAM may be deactivated while displaying the image, identifying the first time, identifying the second time, identifying the difference, and providing the signal.

According to an embodiment, the processor 410 may be configured to change a state of the processor 410 from a wake-up state to a sleep state after transmitting the image to the display driver circuitry 420 through the first interface 415. According to an embodiment, the display driver circuitry 420 may be configured to, while the processor 410 is in the sleep state, identify whether the second time is longer than another reference time duration. According to an embodiment, the display driver circuitry 420 may be configured to, in response to the second time longer than another reference time duration, provide, through the second interface 425, to the processor 410, the signal.

As described above, an electronic device 100 may comprise a processor 410. The electronic device 100 may comprise a display 405 including display driver circuitry 420 and a display panel 110. The electronic device 100 may comprise a first interface 415 connecting the display driver circuitry 420 to the processor 410. The electronic device 100 may comprise a second interface connecting the display driver circuitry 420 to the processor 410. According to an embodiment, the display driver circuitry 420 may be configured to display, on the display panel 110, an image received via the first interface 415 from the processor 410. According to an embodiment, the display driver circuitry 420 may be configured to identify a time elapsed after the displaying of the image while the processor 410 is in a sleep state. According to an embodiment, the display driver circuitry 420 may be configured to, in response to the time longer than a reference time duration, provide, via the second interface 425, to the processor 410 in the sleep state, a signal for requesting an image transmission from the processor 410 to the display driver circuitry 420.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via at least a third element(s). Thus, "connect," "connected" and "connecting" as used herein cover both direct and indirect connections.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

Each "processor" herein includes processing circuitry, and/or may include multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:

at least one processor comprising processing circuitry;

a display including display driver circuitry and a display panel;

a first interface, comprising circuitry, connecting the display driver circuitry to the at least one processor; and a second interface, comprising circuitry, connecting the display driver circuitry to the at least one processor, wherein the display driver circuitry is configured to:

display, on the display panel, a first image received via the first interface from the at least one processor;

display, on the display panel, a second image, subsequent to the first image, received via the first interface from the at least one processor;

while the second image is displayed on the display panel, based on the first image being maintained on the display panel during a time duration longer than a reference time duration in accordance with at least one displaying of the first image, identify whether the second image is at least partially different from the first image, wherein the at least one displaying of the first image includes the displaying of the first image; and in response to the second image being at least partially different from the first image, provide, via the second interface, to the at least one processor, a signal for requesting a retransmission of the second image.

2. The electronic device of claim 1, wherein the display driver circuitry is further configured to:

in response to the second image identical to the first image, refrain from providing the signal via the second interface to the at least one processor.

3. The electronic device of claim 2, further comprising:

memory comprising one or more storage media storing instructions configured to, when executed the at least one processor individually or collectively, cause the electronic device to:

in response to the signal, execute the retransmission of the second image, wherein the display driver circuitry is further configured to:

display again, on the display panel, the second image received via the first interface from the at least one processor in accordance with the retransmission.

4. The electronic device of claim 1, wherein the display driver circuitry is configured to:

before an end timing of a time interval for the displaying of the second image, provide the signal, via the second interface, to the at least one processor.

5. The electronic device of claim 1, wherein the display driver circuitry is configured to:

identify whether the second image is at least partially different from the first image at least by comparing cyclic redundancy check (CRC) data for the second image with CRC data for the first image.

6. The electronic device of claim 1, wherein the display driver circuitry is configured to:

sequentially execute a comparison between the first image and the second image from a comparison between data indicating an initial horizontal line from among a plurality of horizontal lines of the first image and data indicating an initial horizontal line from among a plurality of horizontal lines of the second image toward a comparison between data indicating a last horizontal line from among the plurality of horizontal lines of the first image and data indicating a last horizontal line from among the plurality of horizontal lines of the second image; and in response to identifying a horizontal line of the second image different from a horizontal line of the first image in accordance with the comparison sequentially executed, cease the comparison sequentially executed, and provide, via the second interface, to the at least one processor, the signal.

7. The electronic device of claim 6, wherein a timing at which the signal is to be provided via the second interface to the at least one processor varies in accordance with a position of the horizontal line of the second image different from the horizontal line of the first image.

8. The electronic device of claim 6, wherein data indicating each of the plurality of horizontal lines of the first image used for the comparison sequentially executed is configured with sum, mean, and/or variance of values indicating each of the plurality of horizontal lines of the first image, and wherein data indicating each of the plurality of lines of the second image used for the comparison sequentially executed is configured with sum, mean, and/or variance of values indicating each of the plurality of horizontal lines of the second image.

9. The electronic device of claim 1, wherein the display driver circuitry is further configured to:

based on the first image maintained on the display panel during the time duration shorter than or equal to the reference time duration, bypass identifying whether the second image is at least partially different from the first image.

10. The electronic device of claim 1, wherein the display driver circuitry is configured to:

based on the first image maintained on the display panel during the time duration shorter than or equal to the reference time duration, bypass providing the signal.

11. The electronic device of claim 1, wherein the display driver circuitry is further configured to:

before the second image is received via the first interface from the at least one processor, identify a first time between a displaying on the display panel executed before the displaying of the first image and the displaying of the first image;

identify a second time elapsed after the displaying of the first image;

identify a difference between the first time and the second time; and in response to the difference longer than another reference time duration, provide, via the second interface, to the at least one processor, another signal for requesting an image transmission from the at least one processor to the display driver circuitry.

12. The electronic device of claim 11, further comprising:

memory comprising one or more storage media storing instructions, wherein the reference time duration is a first reference time duration, wherein the other reference time duration is a second reference time duration, wherein the instructions, when executed by the at least one processor individually or collectively, cause the electronic device to:

after transmitting the first image via the first interface to the display driver circuitry, change a state of the at least one processor from a wake-up state to a sleep state, and wherein the display driver circuitry is further configured to:

while the at least one processor is in the sleep state, identify whether the second time is longer than a third reference time duration, and in response to the second time is longer than the third reference time duration, provide, via the second interface, to the at least one processor, the signal.

13. The electronic device of claim 11, wherein the display driver circuitry is further configured to:

while the other signal is provided, identify whether the image transmission is executed by the at least one processor; and in response to the image transmission executed by the at least one processor, cease to provide the other signal via the second interface to the at least one processor.

14. The electronic device of claim 13, wherein the display driver circuitry is further configured to:

before the image transmission is executed, maintain to provide the other signal.

15. The electronic device of claim 11, wherein the display driver circuitry is further configured to:

in response to the difference shorter than or equal to the other reference time duration, bypass or refrain from providing the other signal, and maintain identifying the second time.

16. An electronic device comprising:

at least one processor comprising processing circuitry;

a display including display driver circuitry and a display panel;

a first interface, comprising circuitry, connecting the display driver circuitry to the at least one processor; and a second interface, comprising circuitry, connecting the display driver circuitry to the at least one processor, wherein the display driver circuitry is configured to:

display, via the display panel, an image received through the first interface from the at least one processor;

identify a first time between a displaying on the display panel executed before the displaying of the image and the displaying of the image;

identify a second time elapsed after the displaying of the image;

identify a difference between the first time and the second time; and in response to the difference longer than a reference time duration, provide, via the second interface, to the at least one processor, a signal for requesting an image transmission from the at least one processor to the display driver circuitry.

17. The electronic device of claim 16, wherein the image is a first image, and wherein the display driver circuitry is configured to:

receive a second image transmitted from the at least one processor through the first interface in accordance with the image transmission according to the signal;

display the second image on the display panel;

while the second image is displayed on the display panel, identify a time duration at which the first image is maintained on the display panel based at least in part on the displaying of the image;

based on the time duration longer than another reference time duration, identify whether the second image is at least partially different from the first image; and in response to the second image that is at least partially different from the first image, provide, through the second interface, to the at least one processor, another signal for requesting a retransmission of the second image.

18. The electronic device of claim 17, wherein the display driver circuitry is configured to, in response to the second image that is identical to the first image, refrain from providing, through the second interface, to the at least one processor, the signal.

19. The electronic device of claim 16, wherein the display driver circuitry comprises a graphic random access memory (GRAM), and wherein the GRAM may be deactivated while displaying the image, identifying the first time, identifying the second time, identifying the difference, and providing the signal.

20. The electronic device of claim 16, further comprising:

memory comprising one or more storage media storing instructions to, when executed by the at least one processor individually or collectively, cause the electronic device to:

change a state of the at least one processor from a wake-up state to a sleep state after transmitting the image to the display driver circuitry through the first interface, wherein the display driver circuitry is configured to:

while the at least one processor is in the sleep state, identify whether the second time is longer than another reference time duration; and in response to the second time longer than another reference time duration, provide, through the second interface, to the at least one processor, the signal.

* * * * *